United States Patent
Furuyama

(10) Patent No.: US 9,132,819 B2
(45) Date of Patent: Sep. 15, 2015

(54) VEHICLE CONTROL APPARATUS

(71) Applicant: HITACHI AUTOMOTIVE SYSTEMS, LTD., Hitachinaka-shi, Ibaraki (JP)

(72) Inventor: Hiroshi Furuyama, Atsugi (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 85 days.

(21) Appl. No.: 13/740,319

(22) Filed: Jan. 14, 2013

(65) Prior Publication Data

US 2013/0192937 A1  Aug. 1, 2013

(30) Foreign Application Priority Data

Jan. 27, 2012  (JP) ................. 2012-014755

(51) Int. Cl.
*B60T 13/00* (2006.01)
*B60T 13/66* (2006.01)
*B60T 7/12* (2006.01)
*B60T 13/58* (2006.01)
*B60W 10/04* (2006.01)
*B60W 10/18* (2012.01)
*B60T 8/00* (2006.01)
*B60T 8/17* (2006.01)
*B60T 8/24* (2006.01)
*B60T 8/48* (2006.01)

(52) U.S. Cl.
CPC . *B60T 13/66* (2013.01); *B60T 7/12* (2013.01); *B60T 7/122* (2013.01); *B60T 8/00* (2013.01); *B60T 8/17* (2013.01); *B60T 8/245* (2013.01); *B60T 8/4872* (2013.01); *B60T 13/588* (2013.01); *B60W 10/04* (2013.01); *B60W 10/182* (2013.01); *B60T 2201/06* (2013.01); *B60W 2600/00* (2013.01)

(58) Field of Classification Search
USPC .......... 188/1.11 E, 72.4, 156, 164; 303/6.01, 303/15, 20, 191; 701/70
See application file for complete search history.

(56) References Cited

U.S. PATENT DOCUMENTS

| | | | | |
|---|---|---|---|---|
| 7,140,697 B2 * | 11/2006 | Koga et al. | ...................... | 303/20 |
| 7,813,859 B2 * | 10/2010 | Aizawa et al. | .................. | 701/70 |
| 8,103,421 B2 * | 1/2012 | Kondo et al. | ................... | 701/70 |
| 2008/0053760 A1 * | 3/2008 | Oikawa et al. | ............... | 188/72.4 |
| 2008/0185235 A1 * | 8/2008 | Suzuki | ..................... | 188/1.11 E |
| 2010/0072811 A1 * | 3/2010 | Kondo et al. | ................... | 303/20 |
| 2013/0162010 A1 * | 6/2013 | Koyama et al. | .............. | 303/6.01 |

FOREIGN PATENT DOCUMENTS

JP  2010-208462  9/2010

* cited by examiner

*Primary Examiner* — Christopher Schwartz
(74) *Attorney, Agent, or Firm* — Foley & Lardner LLP

(57) ABSTRACT

A vehicle control apparatus includes: a first braking force generating section configured to actuate, by a hydraulic pressure, wheel cylinders; a second braking force generating section configured to be mechanically regulated to provide the braking force to the one of the wheels; a braking force control switching section configured to automatically switch the second braking force generating section from a non-actuation state to an actuation state when a predetermined condition is satisfied in an actuation state of the first braking force generating section and in the non-actuation state of the second braking force generating section, and to switch the first braking force generating section to the non-actuation state; and a braking force characteristic control section configured to control a braking force characteristic generated by the first braking force generating section, and relating to the switching operation of the braking force control switching section.

18 Claims, 13 Drawing Sheets

VEHICLE CONTROL APPARATUS

BACKGROUND OF THE INVENTION

This invention relates to a vehicle control apparatus.

A Japanese Patent Application Publication No. 2010-208462 discloses a conventional vehicle control apparatus which is arranged to actuate electric parking brakes provided on the rear wheel side after a predetermined time elapsed from a timing at which wheel cylinder pressures of wheels are held during a stop of a vehicle on a sloping road, and to decrease the held hydraulic pressures.

SUMMARY OF THE INVENTION

In the above-described conventional vehicle control apparatus, there is a need for decreasing an unnatural feeling due to a variation of a posture of a vehicle body and a brake noise when the wheel cylinder hydraulic pressures are decreased.

It is, therefore, an object of the present invention to provide a vehicle control apparatus devised to solve the above mentioned problem, and to decrease the unnatural feeling due to the variation of the posture of the vehicle body and the brake noise when the wheel cylinder pressures are decreased.

According to one aspect of the present invention, a vehicle control apparatus comprises: a first braking force generating section configured to actuate, by a hydraulic pressure, wheel cylinders which are mounted on a vehicle, which are connected through hydraulic pipes with a master cylinder, and which are provided, respectively, to a plurality of wheels, and thereby to generate a braking force to the wheels; a second braking force generating section which is provided to one of the plurality of the wheels, and which is configured to be mechanically regulated to provide the braking force to the one of the wheels; a braking force control switching section configured to automatically switch the second braking force generating section from a non-actuation state to an actuation state when a predetermined condition is satisfied in an actuation state of the first braking force generating section and in the non-actuation state of the second braking force generating section, to decrease the hydraulic pressure of the first braking force generating section, and thereby to switch the first braking force generating section to the non-actuation state; and a braking force characteristic control section configured to control a braking force characteristic which is generated by the first braking force generating section, and which relates to the switching operation of the braking force control switching section.

According to another aspect of the invention, a vehicle control apparatus comprises: a first braking force generating section configured to actuate, by a hydraulic pressure, wheel cylinders provided to a plurality of wheels mounted to a vehicle, and thereby to generate a braking force to the wheels by sandwiching discs by brake pads; a second braking force generating section provided to one of the plurality of the wheels, provided as a section different from the first braking force generating section, and arranged to provide to a braking force to the wheels; a first hydraulic pressure generating section actuation state holding section configured to actuate the first braking force generating section in accordance with a brake operation of a driver, and then to hold an actuation state of the first braking force generating section; a braking force control section switching section configured to automatically switch the second braking force generating section from a non-actuation state to an actuation state when the first hydraulic pressure generating section actuation state holding section holds the actuation state and a predetermined condition is satisfied in the non-actuation state of the second braking force generating section; and a braking force characteristic control section configured to control a braking force characteristic generated by the first hydraulic pressure generating section actuation state holding section at the switching of the braking force control section switching section.

According to still another aspect of the invention, a vehicle control method comprises: stopping a vehicle by sandwiching discs rotating with wheels by brake pads each provided to a first braking force generating section by a brake operation of a driver; holding a braking force by the first braking force generating sections after the stop of the vehicle until a predetermined condition is satisfied; decreasing the braking force by disengaging the brake pads and the discs by the first braking force generating sections after the satisfaction of the predetermined condition; previously decreasing the braking force by the first braking force generating sections which is acted to the others of the wheels at switching to an automatic parking brake which can generate the braking force to one of the wheels of the vehicle, and which is a section different from the first braking force generating section; acting the decreased amount of the braking force to the one of the wheels; and limiting decrease gradients of the braking forces generated at the others of the wheels, to a value equal to or smaller than a predetermined gradient.

DETAILED DESCRIPTION OF THE INVENTION

Hereinafter, vehicle control apparatuses according to embodiments of the present invention will be illustrated in detail with reference to the drawings.

Vehicle control apparatuses according to embodiments of the present invention are devised to meet many needs. One of the needs is to decrease an unnatural feeling by a brake noise and a variation of a posture of a vehicle body when hydraulic pressures of wheel cylinders are decreased after an electric parking brake is actuated at a stop of the vehicle on a sloping road. The vehicle control apparatuses according to the embodiments of the present invention are also devised to meet a need to prevent the vehicle from rolling backwards at a restart of the vehicle from the stop on the sloping road.

First Embodiment

First, a structure will be illustrated.

Figure 1:
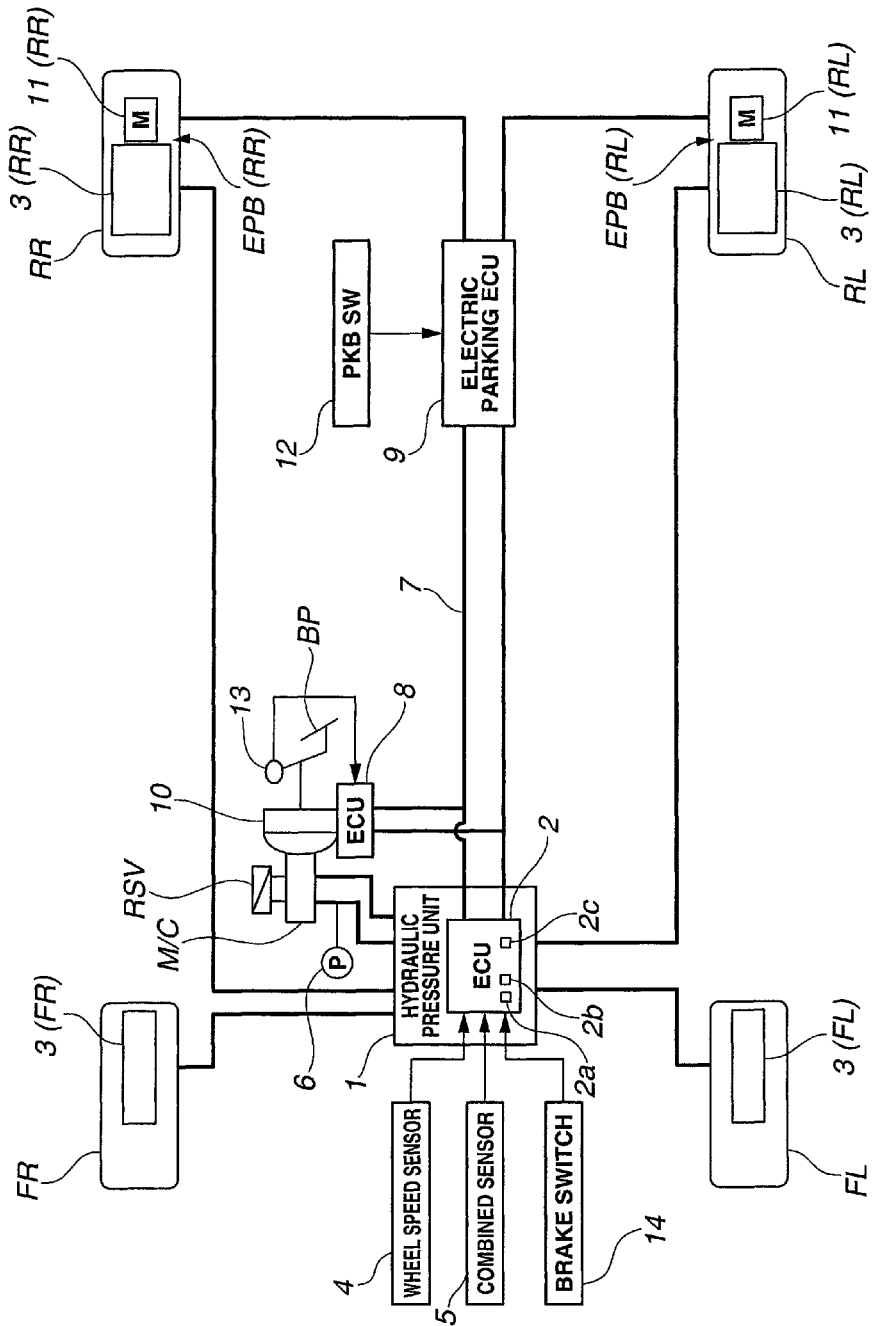
FIG. 1 is a view showing a system configuration of a vehicle according to a first embodiment of the present invention.
Figure 2:
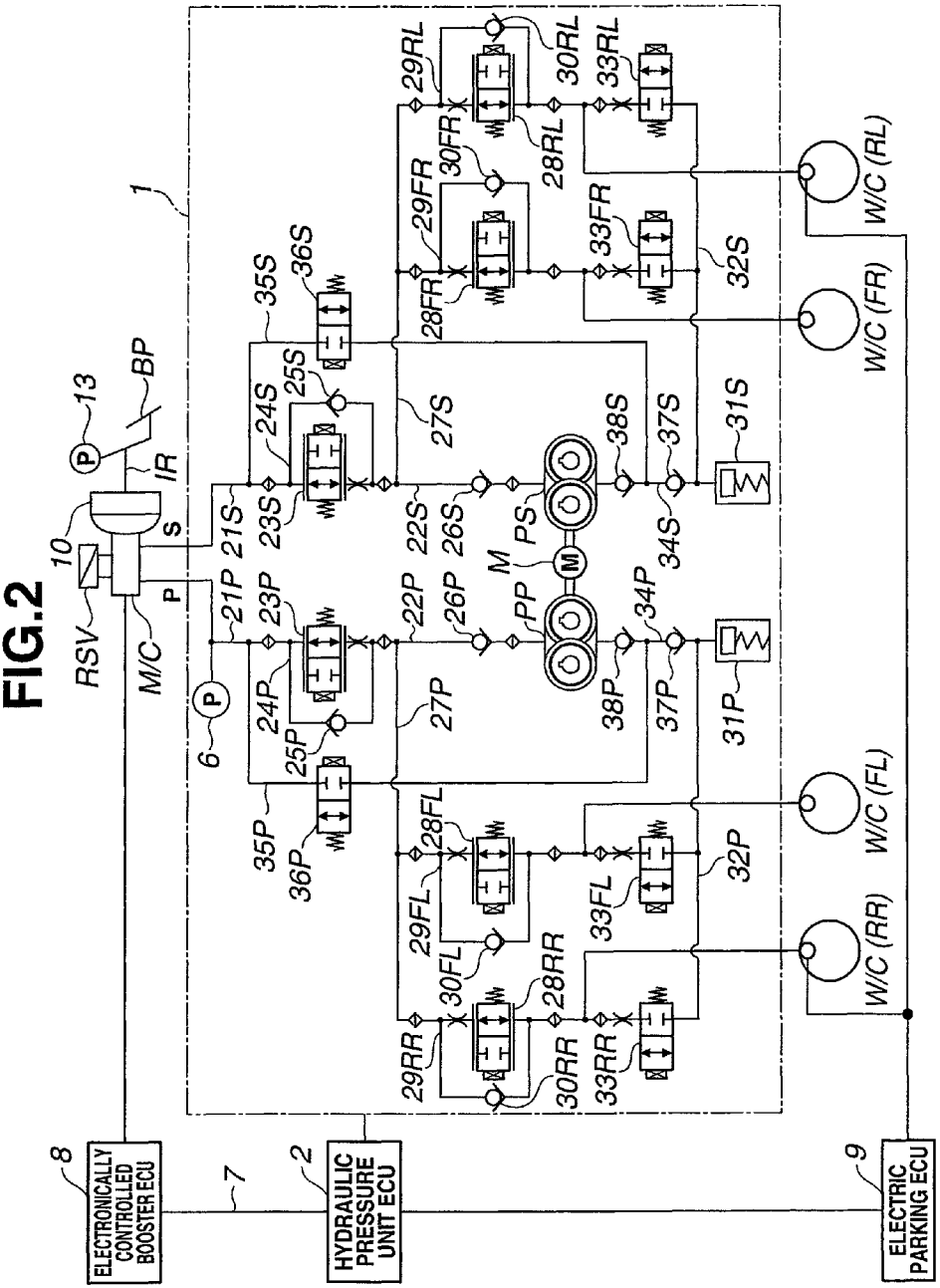
FIG. 2 is a view showing a hydraulic circuit of a hydraulic pressure control actuator according to the first embodiment.

FIG. 1 is a view showing a system configuration of a vehicle according to a first embodiment of the present invention. FIG. 2 is a view showing a hydraulic circuit of a hydraulic pressure control actuator in the first embodiment. In the embodiments of the present invention, the vehicle is a FF vehicle.

[System Configuration]

A hydraulic pressure unit 1 is configured to control the hydraulic pressures of wheel cylinders of wheels FL, FR, RL, and RR in accordance with a command from a hydraulic pressure unit ECU 2, and thereby to control actuations of brake calipers (hereinafter, brake calipers of left and right front wheels FL and FR are referred to as front calipers, and brake calipers of left and right rear wheels RL and RR are referred to as rear calipers) 3. Each of the calipers 3 is configured to be actuated by the hydraulic pressure of corresponding one of the wheel cylinders, to sandwich a disc (not shown) rotating as a unit with one of the wheels by brake pads (not shown), and thereby to generate the braking force to the one of the wheels. Hydraulic pressure unit 1 and brake calipers 3 constitute a main part of a first braking force generating section.

Hydraulic pressure unit ECU 2 directly receives wheel speeds sensed by wheel speed sensors 4, a lateral acceleration, a longitudinal acceleration (accelerations in forward and backward directions), and a yaw rate of the vehicle which are sensed by a combined sensor 5, and a master cylinder pressure which is sensed by a master cylinder hydraulic pressure sensor 6. Moreover, hydraulic pressure unit ECU 2 receives, through communication lines 7, a brake pedal stroke sensed by a brake pedal stroke sensor 13, a brake operation state sensed by a brake switch 14, and a signal such as an accelerator opening degree from an engine controller (not shown). Hydraulic pressure unit ECU 2 is communicated through communication lines 7 with an electrically controlled booster (electronically controlled booster) ECU 8, an electric parking ECU 9, the engine controller, and other ECUs.

Electrically controlled booster ECU 8 controls an electrically controlled booster 10, and boosts (amplifies) the brake pedal stroke. Electrically controlled booster ECU 8 receives the brake pedal stroke sensed by brake pedal stroke sensor 13.

Left and right wheels RL and RR are provided, respectively, with left and right electric motors 11RL and 11RR arranged to actuate left and right rear calipers 3RL and 3RR. Left and right rear calipers 3RL and 3RR and left and right electric motors 11RL and 11RR constitute a main part of an electric parking brake (second braking force generating section) EPB. Left and right electric motors 11RL and 11RR are driven in accordance with a command from electric parking ECU 9. Electric parking ECU 9 is configured to drive electric motors 11RL and 11RR and actuate electric parking brake EPB when the driver operates a parking brake switch 12 to ON state, or when a request of the actuation of electric parking brake EPB is outputted from hydraulic pressure unit ECU 2.

[Hydraulic Unit Structure]

Hydraulic pressure unit 1 in the first embodiment is constituted by two systems of a P system and an S system. Hydraulic pressure unit 1 employs an X-piping structure. Hereinafter, a symbol "P" attached to an end of the symbol of the member in FIG. 2 represents the P system, and a symbol "S" attached to an end of the symbol of the member in FIG. 2 represents the S system. Symbols "RL", "FR", "FL", and "RR" correspond to a left rear wheel, a right front wheel, a left front wheel, and a right rear wheel. In below explanations, the additions of the symbols P and S, and RL, FR, FL, and RR are omitted when not distinguishing between the P system and the S system, and when not distinguishing among the wheels.

The hydraulic pressure unit 1 in the first embodiment uses a closed hydraulic pressure circuit. In this case, the closed hydraulic pressure circuit is a circuit in which the brake fluid supplied to wheel cylinders W/C is returned through master cylinder M/C to a reservoir RSV.

A brake pedal BP is connected through an input rod IR to master cylinder M/C. Input rod IR is provided with electrically controlled booster 10 arranged to boost an input of input rod IR by an electric motor (not shown).

The P system is connected with a wheel cylinder W/C (FL) of left front wheel FL, and a wheel cylinder W/C (RR) of right rear wheel RR. The S system is connected with a wheel cylinder W/C (FR) of right front wheel FR, and a wheel cylinder W/C (RL) of left rear wheel RL. The P system and the S system are provided, respectively, with a pump (hydraulic pressure source) PP and a pump (hydraulic pressure source) PS. Pump PP and Pump PS are, for example, gear pumps. Pump PP and pump PS are driven by one motor M.

Mater cylinder M/C and a discharge side of pump P are connected by a pipe 21 and a pipe 22. A gate-out valve 23 is provided on pipe 21. Gate-out valve 23 is a normally-open proportional solenoid valve. A pipe 24 bypassing gate-out valve 23 is provided on pipe 21. A check valve 25 is provided on pipe 24. Check valve 25 is arranged to allow a flow of the brake fluid in a direction from master cylinder M/C to wheel cylinder W/C, and to prohibit a flow of the brake fluid in an opposite direction from wheel cylinder W/C to master cylinder M/C.

A check valve 26 is provided on pipe 22. Check valve 26 is arranged to allow a flow of the brake fluid in a direction from pump P to pipe 21, and to prohibit a flow of the brake fluid in an opposite direction from pipe 21 to pump P. The discharge side of pump P and wheel cylinder W/C are connected by a pipe 27. A solenoid-in valve 28 is provided on pipe 27. Solenoid-in valve 28 is a normally-open proportional solenoid valve corresponding to each wheel cylinder W/C.

A pipe 29 bypassing solenoid-in valve 28 is provided on pipe 27. A check valve 30 is provided on pipe 29. This check valve 30 is arranged to allow a flow of the brake fluid in a direction from wheel cylinder W/C to pump P, and to prohibit a flow of the brake fluid in an opposite direction from pump P to wheel cylinder W/C. Pipe 27 is connected to a connection point between pipe 21 and pipe 22.

A reservoir 31 and a suction side of pump P are connected by a pipe 34. Pipe 34 is connected by a pipe 35 to a portion of pipe 21 on the master cylinder M/C's side of gate-out valve 23. A gate-in valve 36 is provided on pipe 35. Gate-in valve 36 is a normally-closed solenoid valve.

A check valve 37 is provided on a portion of pipe 34 on the reservoir 31's side of the connection point between pipe 34 and pipe 35. Check valve 37 is arranged to allow a flow of the brake fluid in a direction from reservoir 31 to pump P, and to prohibit a flow of the brake fluid in an opposite direction from pump P to reservoir 31. A check valve 38 is provided on a portion of pipe 34 on the pump P's side of the connection point between pipe 34 and pipe 35. Check valve 38 is arranged to allow a flow of the brake fluid in a direction from reservoir 31 to pump P, and to prohibit a flow of the brake fluid in an opposite direction from pump P to reservoir 31.

[Switching of Braking Force During Hill Hold Control]

Hydraulic unit ECU 2 performs a hill hold control to hold the hydraulic pressures of the wheel cylinders by closing gate-out valves 23 of hydraulic pressure unit 1, and thereby to keep the stop state of the vehicle when a hydraulic pressure holding condition described later is satisfied at the stop of the vehicle on the sloping road, for preventing the vehicle from rolling backward (moving in the backward direction, or slipping down) on the sloping road at the restart from the stop on the sloping road.

In this case, gate-out valve 23 of hydraulic pressure unit 1 is the normally-open solenoid valve. Accordingly, it is necessary to continue to supply the current to the solenoid for keeping the closed state. Therefore, when the stop state on the sloping road is continued during the long time period, (the solenoid of) gate-out valve 23 is heated up, so that the durability is deteriorated.

Therefore, hydraulic pressure unit ECU 2 actuates electric parking brake EPB by sending an actuation request of electric parking brake EPB to electric parking ECU 9 when a predetermined time period elapsed from the stop on the sloping road. When the actuation of electric parking brake EPB is finished (in a state where the vehicle can be stopped only by the braking force by electric parking brake EPB), hydraulic pressure unit ECU 2 switches from the braking force by holding the hydraulic pressures, to the braking force by electric parking brake EPB, by releasing the hydraulic pressures of the wheel cylinders. With this, it is possible to protect gate-out valve 23 while keeping the stop state on the sloping road. Hydraulic pressure unit ECU 2 includes a braking force switching section 2a arranged to perform the above-described switching of the braking force.

[Reduction of Unnatural Feeling at Switching of Braking Force]

Figure 3:
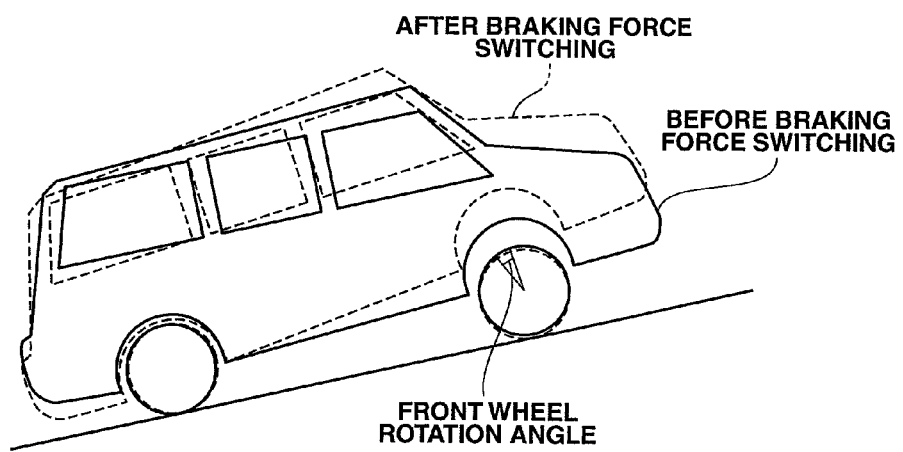
FIG. 3 is an illustrative view showing a variation of a posture of a vehicle body at a switching of a braking force during a hill hold control.

FIG. 3 is an illustrative view showing a variation of a posture of a vehicle body which is generated at the switching of the braking force.

When the vehicle is stopped on the sloping road by the depression of the brake pedal by the driver, it is possible to prevent the vehicle from rolling backwards by holding the hydraulic pressures of the four wheels when the driver releases the brake pedal from a state where the braking force is acted to the four wheels at the initial stage of the stop of the vehicle. A solid line represents the posture of the vehicle body in this case.

The braking force is acted to the rear wheels by the actuation of the parking brake after the predetermined time period elapsed from the stop of the vehicle. Then, when the held hydraulic pressure is released when the vehicle is transited to a state where the vehicle can stop only by the braking force by the parking brake, the braking force acting by the parking brake is remained in the rear wheels, and the braking force is not acted to the front wheels.

In this case, the gravity according to the inclination of the sloping road (climbing road) is acted to the vehicle body. Accordingly, the front portion of the vehicle is slightly floated as shown by a dotted line in FIG. 3, so that the front wheels are rotated by several degrees (a few degrees).

The state of the above-described movement is varied in accordance with the decrease of the braking forces of the front wheels. Accordingly, the sliding frictions are generated between the brake pads and the brake discs of the front wheels, so that a stick-slip phenomenon to repeat the static and dynamical (kinetic) friction states is generated. When that repeat is resonated with a natural frequency (eigenfrequency) of a component around a suspension, "groan noise" which is a noise near 200-300 Hz, that is, brake noise is generated.

In this case, the stick-slip phenomenon is hard to be generated by promptly decreasing the hydraulic pressure. However, the sudden variation of the posture of the vehicle body is generated, so that the unnatural feeling to the driver is increased.

The above-described variation of the posture of the vehicle body is not concerned (worried) when the speed of the decrease of the hydraulic pressure is low, or when the variation of the posture of the vehicle body is varied in accordance with the operation amount of the brake pedal which is operated by the driver oneself. Moreover, it is difficult for the driver to feel the groan noise when the generation level of the noise is low, and when the frequency of the generation of the noise is low.

In the first embodiment, it is an object to decrease the unnatural feeling by the variation of the posture of the vehicle body and the generation of the groan noise. In the first embodiment, the gradients of the decreases of the hydraulic pressures at the decreases of the hydraulic pressures of the wheel cylinders of the four wheels after the actuation of electric parking brake EPB is set to a gentle gradient by the hill hold control shown in FIGS. 4 and 5.

Hydraulic pressure unit ECU 2 includes a first hydraulic pressure generating section actuation state holding section 2b configured to actuate the first braking force generating section (hydraulic pressure unit 1 and brake calipers 3) by the brake operation of the driver, and then to hold the hydraulic pressures of the wheel cylinders after the end of the brake operation of the driver; and a braking force characteristic control section 2c configured to control the braking force characteristic which is generated by the first braking force generating section, and which relates to the switching operation of braking force control switching section 2a.

[Hill Hold Control Operation]

Figure 4:
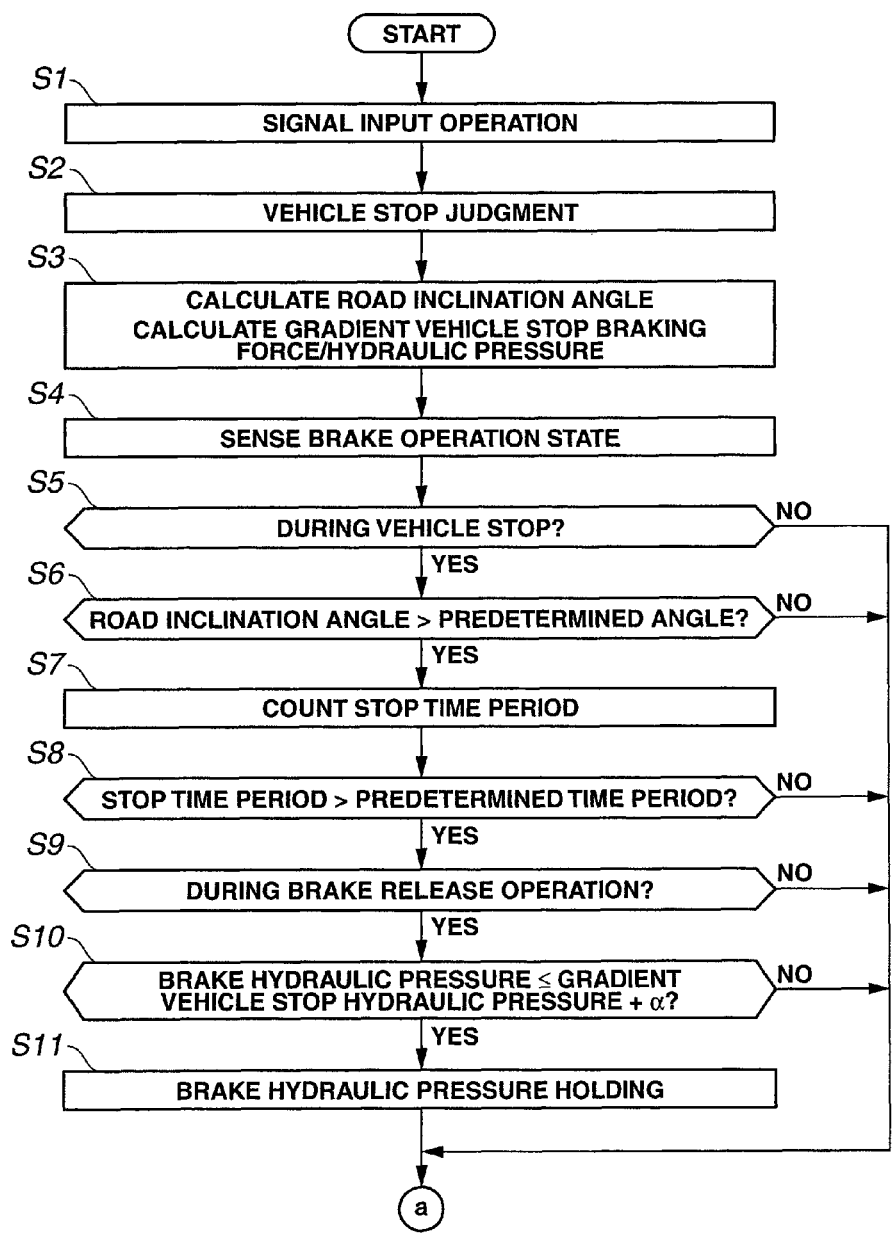
FIG. 4 is a flowchart showing a flow of the hill hold control operation performed in a hydraulic pressure unit ECU 2 in the first embodiment of the present invention.
Figure 5:
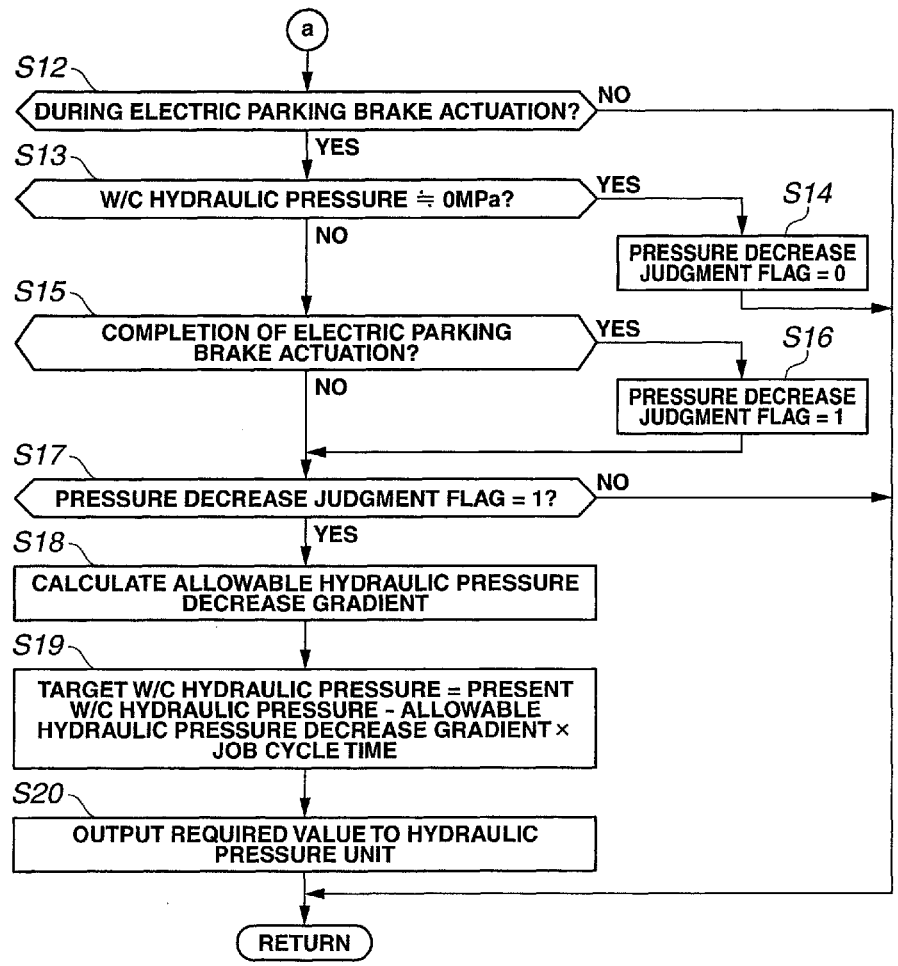
FIG. 5 is a flowchart showing a flow of the hill hold control operation performed in the hydraulic pressure unit ECU 2 in the first embodiment of the present invention.

FIGS. 4 and 5 are flowcharts showing flows of the hill hold control operation performed in the hydraulic pressure unit ECU 2 in the first embodiment. Hereinafter, steps in FIGS. 4 and 5 are illustrated. This operation is repeated at a predetermined JOB cycle time.

At step S1, the input operation of the sensor signals is performed. Each of raw values (raw data) of the sensor signals are read as a signal which passed through a hard low pass filter (LPF) which corresponds to a read cycle of hydraulic pressure unit ECU 2 that is previously set, and which is not affected by the aliasing. A soft LPF operation is performed to this signal for removing the superimposition of the electrical noise, and the vibration of the vehicle body. A LPF frequency characteristic is set to a frequency by which the variations of the pressure and the movement can be sufficiently sensed even when the driver operates rapidly.

At step S2, the stop of the vehicle is judged when the speeds of all of the four wheels are smaller than the predetermined speed during a predetermined time period. The operation at step S2 corresponds to a vehicle stop state judging section configured to judge the stop state of the vehicle.

At step S3, hydraulic pressure unit ECU 2 calculates a road inclination angle (road gradient) from the forward and backward G during the stop of the vehicle. The hydraulic pressure unit ECU 2 calculates the backward rolling force (=gradient vehicle stop braking force) which is generated in the vehicle during the stop, based on the calculated road inclination angle and the weight of the vehicle. Moreover, hydraulic pressure unit ECU 2 calculates a gradient vehicle stop hydraulic pressure which is identical to the backward rolling force, that is, a brake hydraulic pressure necessary for keeping the stop state of the vehicle, by multiplying the calculated backward rolling force by a braking force-brake hydraulic pressure conversion coefficient. In this case, the braking force-brake hydraulic pressure conversion coefficient is previously calculated from the effective radius of the rotor of the brake, a radius of the tire, a pad friction coefficient, a radius of the piston of the brake caliper, and so on.

At step S4, hydraulic pressure unit ECU 2 senses a brake operation state where brake pedal BP is clearly depressed, based on the hydraulic pressure of the master cylinder, and the state of the brake switch 14.

At step S5, hydraulic pressure unit ECU 2 judges whether or not the vehicle is in the above-described stop state. When the answer of step S5 is affirmative (YES), the process proceeds to step S6. When the answer of step S5 is negative (NO), the process proceeds to step S12.

At step S6, it is judged whether or not the inclination angle of the road is greater than a predetermined angle. When the answer of step S6 is affirmative (YES), the process proceeds to step S7. When the answer of step S6 is negative (NO), the process proceeds to step S12.

At step S7, hydraulic pressure unit ECU 2 counts the time period of the stop of the vehicle.

At step S8, hydraulic pressure unit ECU 2 judges whether or not the time period of the stop of the vehicle becomes greater than the predetermined time period. When the answer of step S8 is affirmative (YES), the process proceeds to step S9. When the answer of step S8 is negative (NO), the process proceeds to step S12.

At step S9, hydraulic pressure unit ECU 2 judges whether or not the hydraulic pressure of the master cylinder is decreased, and thereby judges whether or not the brake pedal is released. When the answer of step S9 is affirmative (YES), the process proceeds to step S10. When the answer of step S9 is negative (NO), the process proceeds to step S12.

At step S10, hydraulic pressure unit ECU 2 judges whether or not the brake hydraulic pressure is equal to or the gradient vehicle stop hydraulic pressure+α. When the answer of step S10 is affirmative (YES), the process proceeds to step S11. When the answer of step S10 is negative (NO), the process proceeds to step S12.

Step S5, step S6, step S8, step S9, and step S10 correspond to the hydraulic pressure holding condition in the hill hold control.

At step S11, first hydraulic pressure generating section actuation state holding section 2b adds, as a predetermined margin rate, an amount (value) of about 10%, to the gradient vehicle stop hydraulic pressure, thereby calculates the hydraulic pressure holding demands, and actuates the hydraulic pressure holding function by hydraulic pressure unit 1. With this, it is possible to surely prevent the vehicle from rolling backwards.

At step S12, hydraulic pressure unit ECU 2 judges whether or not electric parking brake EPB is actuated. When the answer of step S12 is affirmative (YES), the process proceeds to step S13. When the answer of step S12 is negative (NO), the process proceeds to the return.

At step S13, hydraulic pressure unit ECU 2 judges whether or not the current wheel cylinder pressures are substantially zero ($\approx 0$) MPa. When the answer of step S13 is affirmative (YES), the process proceeds to step S14. When the answer of step S13 is negative (NO), the process proceeds to step S15.

At step S14, hydraulic pressure unit ECU 2 resets the pressure decrease judgment flag (=0), and stores the completion of the pressure decrease.

At step S15, hydraulic pressure unit ECU 2 judges whether or not the actuation of electric parking brake EPB is finished (whether or not the vehicle can stop only by the braking force of electric parking brake EPB). When the answer of step S15 is affirmative (YES), the process proceeds to step S16. When the answer of step S15 is negative (NO), the process proceeds to step S17.

At step S16, hydraulic pressure unit ECU 2 set the pressure decrease judgment flag (=1), and stores that the pressure decrease is started.

At step S17, hydraulic pressure unit ECU 2 judges whether or not the pressure decrease judgment flag is set (whether or not the vehicle is during the pressure decrease operation). When the answer of step S17 is affirmative (YES), the process proceeds to step S18. When the answer of step S17 is negative (NO), the process proceeds to the return.

Figure 6:
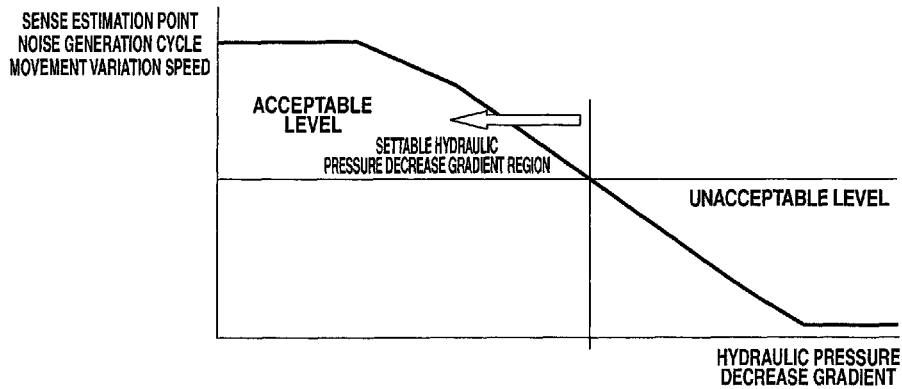
FIG. 6 is a calculation map of an allowable hydraulic pressure decrease gradient.

At step S18, the braking force characteristic control section 2c calculates an allowable hydraulic pressure decrease gradient which is the decrease gradient of the hydraulic pressure by which the generation cycle of the groan noise at the above-described pressure decrease becomes equal to or smaller than a cycle which does not cause a problem in the sense. FIG. 6 is a calculation map of the allowable hydraulic pressure decrease gradient. In the first embodiment, the relationship between the hydraulic pressure decrease gradient and the sensory estimation is previously determined. The hydraulic pressure decrease gradient is set so that the variation of the posture of the vehicle body and the generation of the groan noise do not provide the unnatural feeling to the driver. In particular, for example, the hydraulic pressure decrease gradient is set so that the rotation angle of the wheel is equal to or smaller than 1 degree during 1 second, and so that the generation frequency of the groan noise is equal to or smaller than one per 0.5 seconds.

At step S19, hydraulic pressure unit ECU 2 calculates the pressure decrease amount of 1 JOB cycle from the allowable hydraulic pressure decrease gradient and the JOB cycle time. Hydraulic pressure unit ECU 2 calculates, as a target wheel cylinder hydraulic pressure, a value obtained by subtracting the pressure decrease amount of 1 JOB cycle from the current wheel cylinder hydraulic pressure.

At step S20, braking force control switching section 2a decreases the holding pressure of the hydraulic pressure holding function of the hydraulic pressure unit 1 in accordance with the value (the requested wheel cylinder hydraulic pressure) calculated at step S19.

By the above-described control operation, it is possible to decrease the generation cycle of the groan noise generated by the above-described brake stick-slip, to a value equal to or smaller than a problem-free cycle. Moreover, it is possible to slow the variation of the posture of the vehicle body, and to decrease the speed of the variation of the posture of the vehicle body, to a problem-free level in the sense. Furthermore, it is possible to perform sequential functions of the brake operation of the driver, the wheel cylinder hydraulic pressure holding, the actuation of electric parking brake EPB, and the release of the wheel cylinder hydraulic holding, without providing the unnatural feeling.

Next, functions are illustrated.

Figure 7:
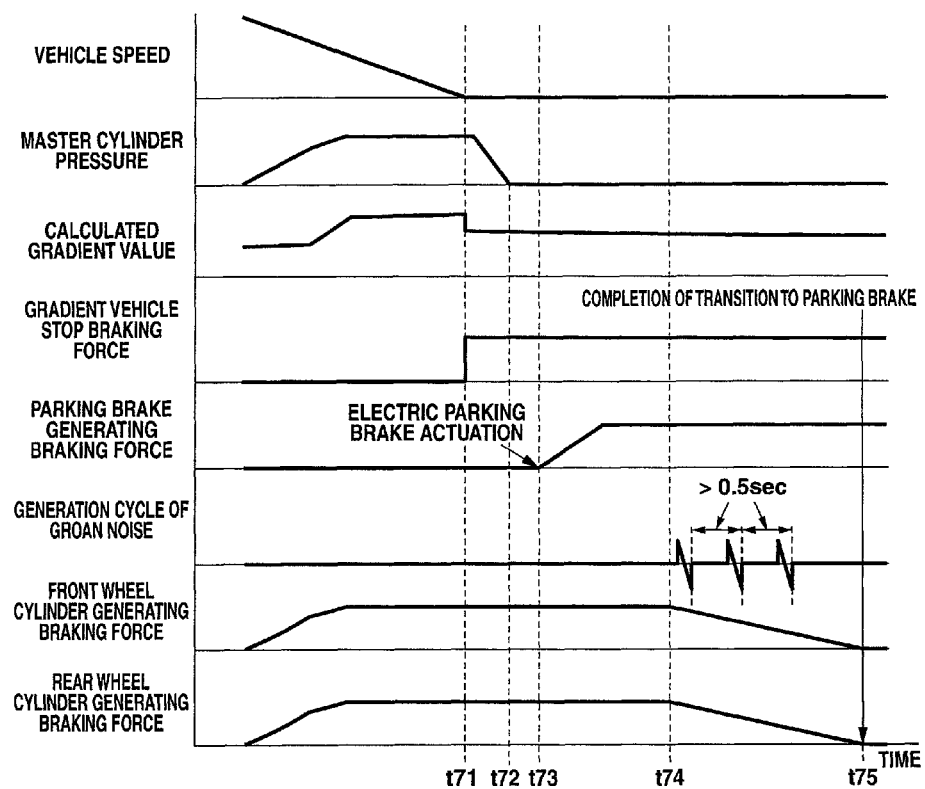
FIG. 7 is a time chart showing an unnatural feeling decreasing function by the hill hold control in the first embodiment when a brake pedal BP is not depressed at the actuation of the electric parking brake EPB.

FIG. 7 is a time chart showing the unnatural feeling decreasing function by the hill hold control in the first embodiment when brake pedal BP is not depressed at the actuation of electric parking brake EPB.

At time t71, the vehicle speed (the vehicle body speed) becomes zero. In this case, forward and backward G acted to the vehicle is only component depending on the acceleration of the gravity. Accordingly, it is possible to calculate the calculated gradient value (the road inclination angle) from the forward and backward G of the vehicle.

At time t72, the hydraulic pressure of the master cylinder becomes zero. However, the hydraulic pressure holding function is already actuated, so that the vehicle does not roll backwards.

At time t73, the predetermined time period elapsed from the stop of the vehicle. Accordingly, electric parking brake EPB is actuated.

At time t74, the actuation of electric parking brake EPB is completed. Accordingly, in an interval from time t74 to time t75, the hydraulic pressures of the wheel cylinders of the four wheels are decreased to zero along the allowable hydraulic pressure decrease gradient. In this case, the rotation angle each of the wheels is equal to or smaller than 1 degree per second (during 1 second), and the interval of the generation of the groan noise is longer than 0.5 seconds. Accordingly, it is possible to suppress (minimize) the unnatural feeling to the driver.

At time t75, the hydraulic pressures of the wheel cylinders of the four wheels become zero, so that the state transition to electric parking brake EPB is completed.

Figure 8:
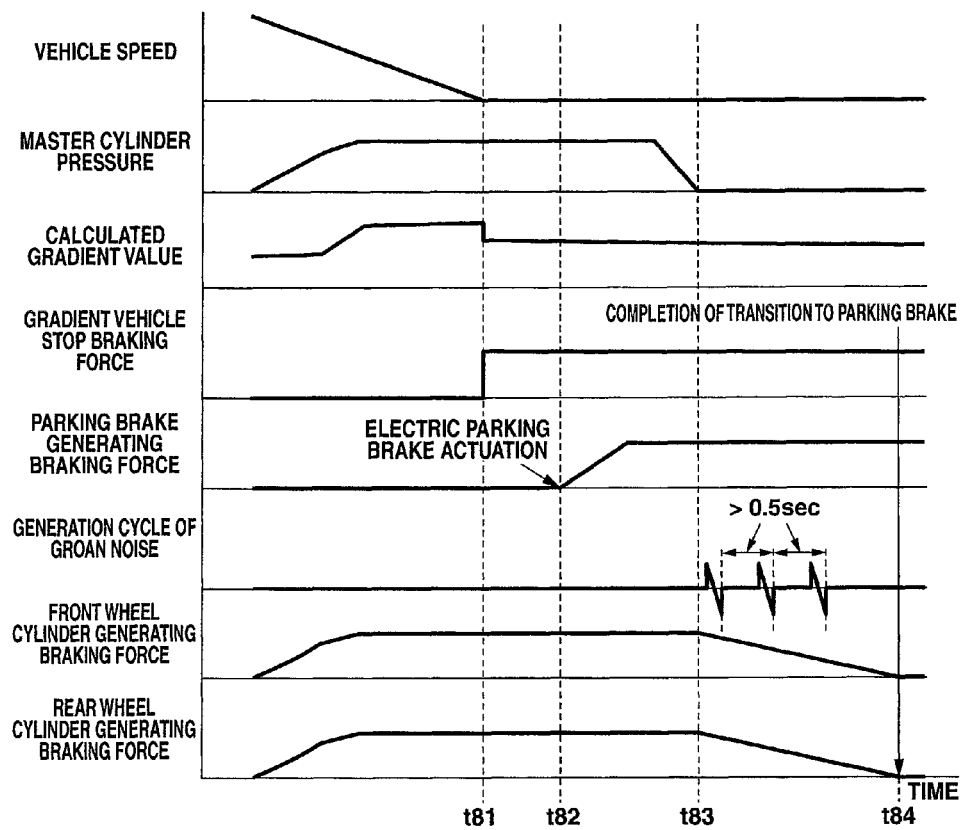
FIG. 8 is a time chart showing the unnatural feeling decreasing function by the hill hold control in the first embodiment when the brake pedal BP is depressed at the actuation of the electric parking brake EPB.

FIG. 8 is a time chart showing the unnatural feeling decreasing function by the hill hold control in the first embodiment when the brake pedal BP is depressed at the actuation of electric parking brake EPB.

At time t81, the vehicle speed becomes zero. In this case, the forward and backward G acted to the vehicle is only a component depending on the acceleration of the gravity. Accordingly, it is possible to calculate the calculated gradient value from the forward and backward G of the vehicle.

At time t82, the predetermined time period is elapsed from the stop of the vehicle. Accordingly, electric parking brake EPB is actuated.

At time t83, the hydraulic pressure of the master cylinder becomes zero. However, the hydraulic pressure holding function is already actuated, so that the vehicle does not roll backwards. In an interval from time t83 to time 84, the hydraulic pressures of the wheel cylinders of the four wheels are decreased to zero along the allowable hydraulic pressure decrease gradient. In this case, the rotation angle of the wheel is equal to or smaller than 1 degree per second (during 1 second), and the interval of the generation of the groan noise is longer than 0.5 seconds. Accordingly, it is possible to suppress (minimize) the unnatural feeling to the driver.

At time t84, the hydraulic pressures of the wheel cylinders of the four wheels become zero. Accordingly, the state transition to electric parking brake EPB is finished.

Next, functions are illustrated.

A vehicle control apparatus according to the embodiment of the present invention includes: a first braking force generating section (hydraulic pressure unit 1, brake caliper 3) configured to actuate, by a hydraulic pressure, wheel cylinders (W/C) which are mounted on a vehicle, which are connected through hydraulic pipes (21, 27) with a master cylinder (M/C), and which are provided, respectively, to a plurality of wheels (FL, FR, RL, RR), and thereby to generate a braking force to the wheels; a second braking force generating section (EPB) which is provided to one (RL, RR) of the plurality of the wheels, and which is configured to be mechanically regulated to provide the braking force to one of the wheels (RL, RR); a braking force control switching section (2a) configured to automatically switch the second braking force generating section (EPB) from a non-actuation state to an actuation state when a predetermined condition is satisfied in an actuation state of the first braking force generating section and in the non-actuation state of the second braking force generating section, to decrease the hydraulic pressure of the first braking force generating section, and thereby to switch the first braking force generating section to the non-actuation state; and a braking force characteristic control section (2c) configured to control a braking force characteristic which is generated by the first braking force generating section, and which relates to the switching operation of the braking force control switching section (2a).

That is, it is possible to regulate the variation speed of the vehicle body and the generation frequency of the groan noise when the hydraulic pressures of the wheel cylinders are decreased (sucked), and thereby to decrease the unnatural feeling due to the variation of the posture of the vehicle body and the brake noise.

(2) In the vehicle control apparatus according to the embodiment of the present invention, the vehicle control apparatus further includes a first hydraulic pressure generating section actuation state holding section (2b) configured to hold a state of the hydraulic pressures of the wheel cylinders after an end of an operation of the brake by a driver after the actuation of the first braking force generating section by the operation of the brake by the driver; and the braking force control switching section (2a) is configured to perform the switching after the actuation of the first hydraulic pressure generating section actuation state holding section.

That is, electric parking brake EPB is actuated after the actuation of the hydraulic pressure holding function. Accordingly, it is possible to surely prevent the vehicle from rolling backwards when the driver releases brake pedal BP.

(3) In the vehicle control apparatus according to the embodiment of the present invention, the braking force characteristic control section (2c) is configured to limit a decrease gradient of the hydraulic pressure when the hydraulic pressure of one of the wheel cylinders is decreased, to a value equal to or smaller than a predetermined gradient.

That is, it is possible to suppress the variation speed of the posture of the vehicle body and the generation frequency of the groan noise, to the speed and the frequency which do not provide the unnatural feeling to the driver, by limiting the hydraulic pressure decrease gradient.

(4) In the vehicle control apparatus according to the embodiment of the present invention, the braking force characteristic control section (2c) is configured to limit decrease gradients of the hydraulic pressures of the wheel cylinders provided to the others (FL, FR) of the plurality of the wheels, to the value equal to or smaller than the predetermined gradient.

That is, it is possible to suppress the variation speed of the posture of the vehicle body and the generation frequency of the groan noise, to the speed and the frequency which do not provide the unnatural feeling to the driver, by limiting the decrease gradients of the hydraulic pressures of the wheel cylinders of the front wheels FL and FR which may cause the variation of the posture of the vehicle body, and the generation of the groan noise.

(5) In the vehicle control apparatus according to the embodiment of the present invention, the predetermined gradient of the hydraulic pressure is set so that a cycle of a generation of a noise (groan noise) generated in response to the decrease of the hydraulic pressure of the first braking force generating section becomes equal to or greater than a predetermined cycle (0.5 seconds).

Accordingly, it is possible to suppress the generation frequency of the groan noise, to the frequency which does not provide the unnatural feeling to the driver.

(6) In the vehicle control apparatus according to the embodiment of the present invention, the vehicle control apparatus further includes a vehicle stop state judging section (S2) configured to judge a stop state of the vehicle; and the first braking force generating section actuation state holding section (2b) is configured to actuate after the vehicle stop state judging section judges the stop state of the vehicle.

That is, it is possible to prevent the vehicle from rolling backwards, by holding the hydraulic pressures in a state where the hydraulic pressures to keep the stop state of the vehicle are held in wheel cylinders W/C of the front and rear wheels.

(7) In the vehicle control apparatus according to the embodiment of the present invention, the predetermined condition is that a predetermined time period elapses from the actuation of the first braking force generating section actuation state holding section (2b).

That is, it is possible to prevent the vehicle from rolling backwards by the switching of the braking force after the completion of the hydraulic pressure holding by first braking force generating section actuation state holding section 2b.

(8) A vehicle control apparatus according to the embodiment of the present invention: a first braking force generating section configured to actuate, by a hydraulic pressure, wheel cylinders provided to a plurality of wheels (FL, FR, RL, RR) mounted to a vehicle, and thereby to generate a braking force to the wheels by sandwiching discs by brake pads; a second braking force generating section provided to one of the plurality of the wheels, provided as a section different from the first braking force generating section, and arranged to provide to a braking force to the wheels; a first hydraulic pressure generating section actuation state holding section (2b) configured to actuate the first braking force generating section in accordance with a brake operation of a driver, and then to hold an actuation state of the first braking force generating section; a braking force control section switching section (2a) configured to automatically switch the second braking force generating section from a non-actuation state to an actuation state when the first hydraulic pressure generating section actuation state holding section (2b) holds the actuation state and a predetermined condition is satisfied in the non-actuation state of the second braking force generating section; and a braking force characteristic control section (2c) configured to control a braking force characteristic generated by the first hydraulic pressure generating section actuation state holding section (2b) at the switching of the braking force control section switching section (2a).

Accordingly, it is possible to regulate the variation speed of the posture of the vehicle body and the generation frequency of the groan noise when the hydraulic pressure of the first braking force generating section is decreased, and thereby to decrease the unnatural feeling by the variation of the posture of the vehicle body, and the brake noise.

(9) In the vehicle control apparatus according to the embodiment of the present invention, a vehicle control method includes: stopping a vehicle by sandwiching discs rotating with wheels by brake pads each provided to a first braking force generating section by a brake operation of a driver; holding a braking force by the first braking force generating sections after the stop of the vehicle until a predetermined condition is satisfied; decreasing the braking force by disengaging the brake pads and the discs by the first braking force generating sections after the satisfaction of the predetermined condition; previously decreasing the braking force by the first braking force generating sections which is acted to the others of the wheels at switching to an automatic parking brake (electric parking brake EPB) which can generate the braking force to one of the wheels of the vehicle, and which is a section different from the first braking force generating section; and acting the decreased amount of the braking force to the one of the wheels; and limiting decrease gradients of the braking forces generated at the others of the wheels, to a value equal to or smaller than a predetermined gradient.

Accordingly, it is possible to suppress the variation speed of the posture of the vehicle body and the generation frequency of the groan noise, to the speed and the frequency which do not provide the unnatural feeling to the driver, by limiting the decrease gradients of the hydraulic pressures of the wheel cylinders of the front wheels FL and FR which may cause the variation of the posture of the vehicle body and the generation of the groan noise.

Second Embodiment

In a second embodiment, the hydraulic pressures of the wheel cylinders of the front and rear wheels are different from each other when the hydraulic pressures are held at the hill hold control, unlike the first embodiment.

[Hill Hold Control Operation]

Figure 9:
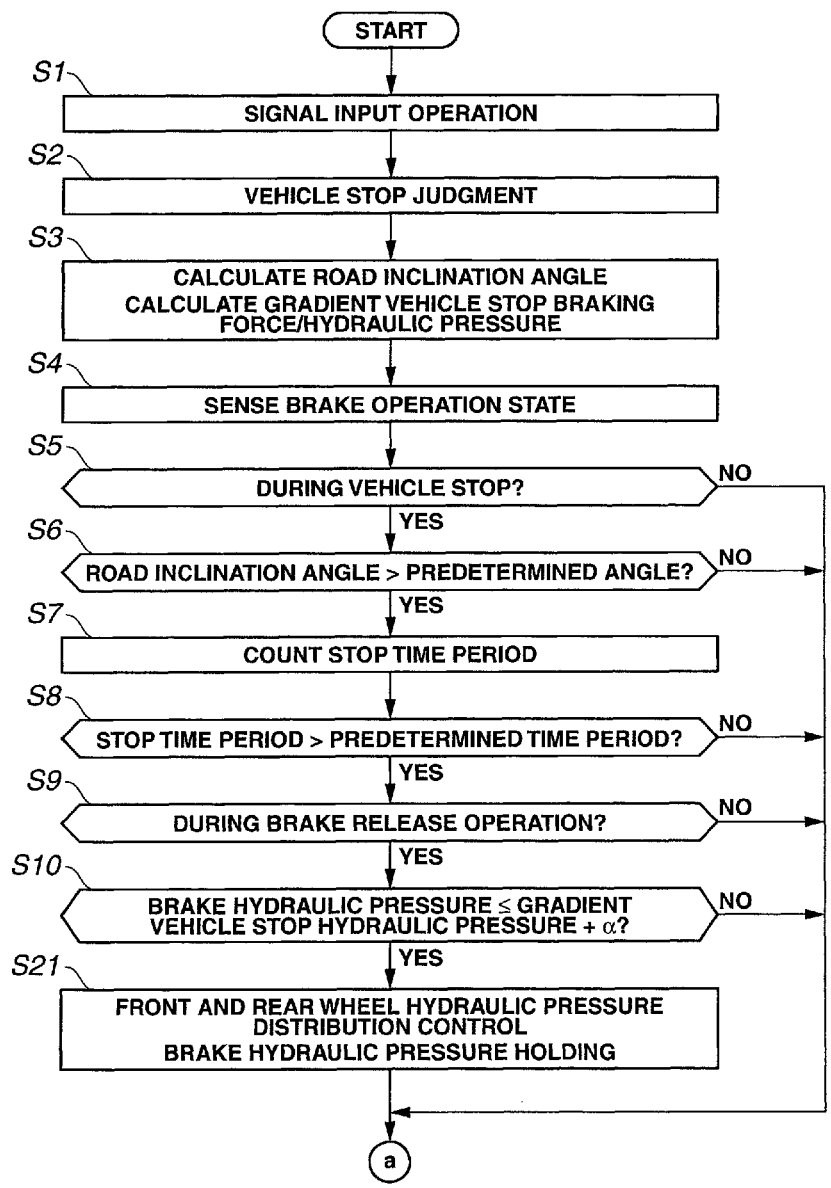
FIG. 9 is a flowchart showing a hill hold control operation performed in a hydraulic pressure unit ECU 2 in a second embodiment of the present invention.

FIG. 9 is a flowchart showing a flow of the hill hold control operation performed in the hydraulic pressure unit ECU 2 in the second embodiment. The hill hold control operation according to the second embodiment is substantially identical to the hill hold control operation according to the first embodiment shown in FIG. 4 in most aspects as shown by the use of the same step number. The repetitive illustrations of the same steps are omitted. Moreover, the operation subsequent to "to a" in FIG. 9 is identical to the hill hold control operation of the first embodiment shown in FIG. 5. Accordingly, the drawing and the illustrations of the operation subsequent to "to a" in FIG. 9 are omitted.

At step S21, first hydraulic pressure generating section actuation state holding section 2b performs a front and rear wheel hydraulic pressure distribution control to decrease the hydraulic pressures of the wheel cylinders of front wheels FL and FR, and to increase the hydraulic pressures of the wheel cylinders of rear wheels RL and RR by the decreased amount of the hydraulic pressures of the wheel cylinders of front wheels FL and FR by the pump. Then, the hydraulic pressure holding function by the hydraulic pressure unit 1 is actuated.

Next, functions and effects are illustrated.

Figure 10:
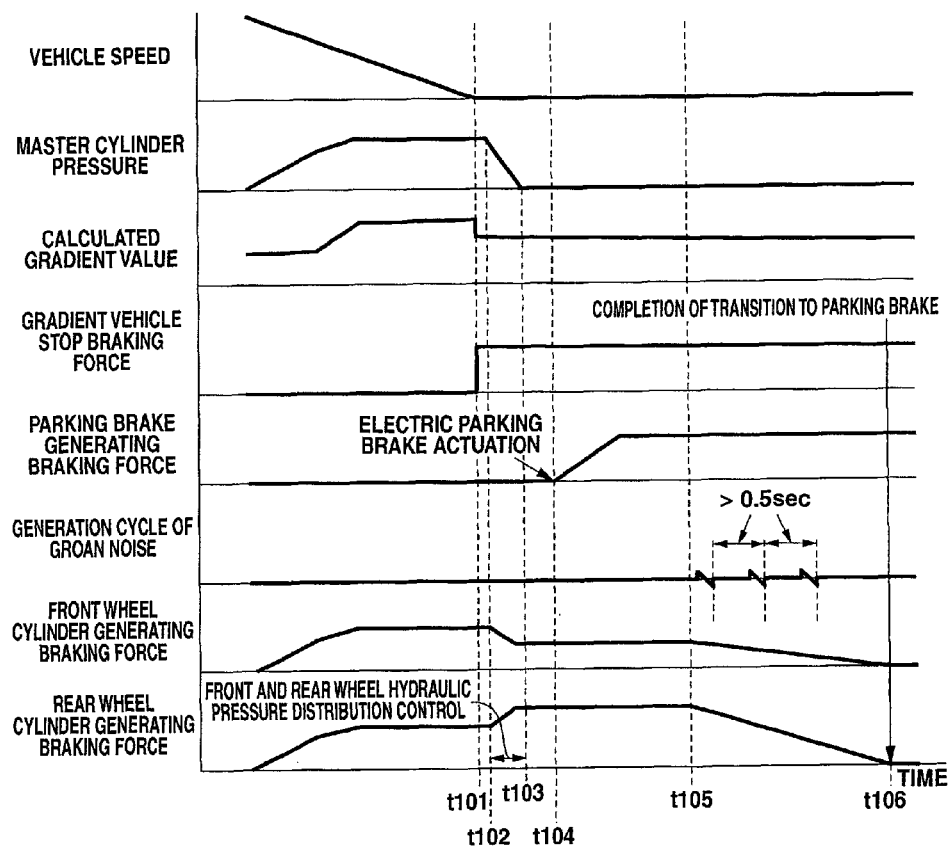
FIG. 10 is a time chart showing an unnatural feeling decreasing function by the hill hold control in the second embodiment when the brake pedal BP is not depressed at the actuation of the electric parking brake EPB

FIG. 10 is a time chart showing the unnatural feeling decreasing function by the hill hold control in the second embodiment when brake pedal BP is not depressed at the actuation of electric parking brake EPB.

At time t101, the vehicle speed becomes zero. In this case, the forward and backward G acted to the vehicle is only the component depending on the acceleration of the gravity.

Accordingly, it is possible to calculate the calculated gradient value from the forward and backward G of the vehicle.

At time t102, the hydraulic pressure holding function is actuated. In this case, the hydraulic pressures of the wheel cylinders of front wheels FL and FR are decreased by the front and rear wheel hydraulic pressure distribution control. However, the hydraulic pressures of the wheel cylinders of rear wheels RL and RR are increased by the above-described decreased amounts of the wheel cylinders of front wheels FL and FR. Accordingly, the total braking force is held to the constant value. Consequently, it is possible to prevent the vehicle from rolling backwards.

At time t103, the hydraulic pressure of the master cylinder becomes zero. However, the hydraulic pressure holding function is already actuated, so that the vehicle does not roll backwards.

At time t104, the predetermined time period elapsed from the stop of the vehicle. Accordingly, electric parking brake EPB is actuated.

At time t105, the actuation of electric parking brake EPB is finished. In an interval from time t105 to time t106, the hydraulic pressures of the wheel cylinders of front wheels FL and FR are decreased to zero along the allowable hydraulic pressure decrease gradient. Moreover, the hydraulic pressures of the wheel cylinders of rear wheels RL and RR are decreased to zero. In this case, each of the rotation angles of the wheels is equal to or smaller than 1 degree per second (during 1 second), and the interval of the generation of the groan noise is longer than 0.5 seconds. Accordingly, it is possible to minimize the unnatural feeling to the driver.

Moreover, in the second embodiment, the hydraulic pressures of the wheel cylinders of front wheels FL and FR which may cause the variation of the vehicle body posture and the generation of the groan noise are previously decreased by the front and rear wheel hydraulic pressure distribution control before the hydraulic pressure holding function is actuated. Accordingly, it is possible to further decrease the hydraulic pressure decrease gradient when the hydraulic pressures of the wheel cylinders of front wheels FL and FR are decreased to zero by releasing the hydraulic pressure holding function, relative to the first embodiment. Therefore, it is possible to further decrease the unnatural feeling to the driver. Moreover, the hydraulic pressures of the wheel cylinders of rear wheels RL and RR are increased by the decreased hydraulic pressures of the wheel cylinders of the front wheels FL and FR. Accordingly, the total braking force is held to the constant value. Therefore, it is possible to prevent the vehicle from rolling backwards.

At time t106, the hydraulic pressures of the wheel cylinders of the four wheels become zero. The state transition to electric parking brake EPB is finished.

Next, the functions are illustrated.

(10) In the vehicle control apparatus according to the embodiment of the present invention, the braking force characteristic control section (2c) is configured to increase the hydraulic pressure of the wheel cylinder of the one (RR, RL) of the wheels which is held by the first braking force generating section actuation state holding section (2b), and then to decrease the hydraulic pressures of the wheel cylinders of the four wheels.

Accordingly, it is possible to further surely prevent the vehicle from rolling backwards.

(11) In the vehicle control apparatus according to the embodiment of the present invention, the braking force characteristic control section (2c) is configured to decrease the hydraulic pressures of the wheel cylinders provided to the others (FL, FR) of the wheels, and to increase the hydraulic pressure of the wheel cylinder provided to the one (RL, RR) of the wheels by the decreased amount of the hydraulic pressures of the wheel cylinders provided to the others of the wheels.

Accordingly, it is possible to decrease the hydraulic pressure decrease gradients when the hydraulic pressures of the wheel cylinders of front wheels FL and FR are decreased to zero. Consequently, it is possible to further decrease the unnatural feeling to the driver. Moreover, the total braking force of the vehicle is held to the constant value. Accordingly, it is possible to prevent the vehicle from rolling backwards.

(12) In the vehicle control apparatus according to the embodiment of the present invention, the braking force characteristic control section (2c) is configured to determine the characteristic of the hydraulic pressure to keep a total braking force at the increase and the decrease of the hydraulic pressures of the wheel cylinder.

Accordingly, the total braking force of the vehicle is held to the constant value. Consequently, it is possible to prevent the vehicle from rolling backwards.

(13) A vehicle control method according to the embodiment of the present invention includes: stopping a vehicle by sandwiching discs rotating with wheels by brake pads each provided to a first braking force generating section by a brake operation of a driver; holding a braking force by the first braking force generating sections after the stop of the vehicle until a predetermined condition is satisfied; decreasing the braking force by disengaging the brake pads and the discs by the first braking force generating sections after the satisfaction of the predetermined condition; previously decreasing the braking force by the first braking force generating sections which is acted to the others (FL, FR) of the wheels at switching to an automatic parking brake which can generate the braking force to one (RL, RR) of the wheels of the vehicle, and which is a section different from the first braking force generating section; acting the decreased amount of the braking force to the one (RL, RR) of the wheels; and limiting decrease gradients of the braking forces generated at the others of the wheels, to a value equal to or smaller than a predetermined gradient.

Accordingly, it is possible to decrease the hydraulic pressure decrease gradients when the hydraulic pressures of the wheel cylinders of the front wheels FL and FR are decreased to zero. Consequently, it is possible to further decrease the unnatural feeling to the driver. Moreover, the total braking force of the vehicle is held to the constant value. Accordingly, it is possible to prevent the vehicle from rolling backwards.

Third Embodiment

In a third embodiment, the variation of the posture of the vehicle body is counteracted by the engine torque, unlike the first embodiment.

[Hill Hold Control Operation]

Figure 11:
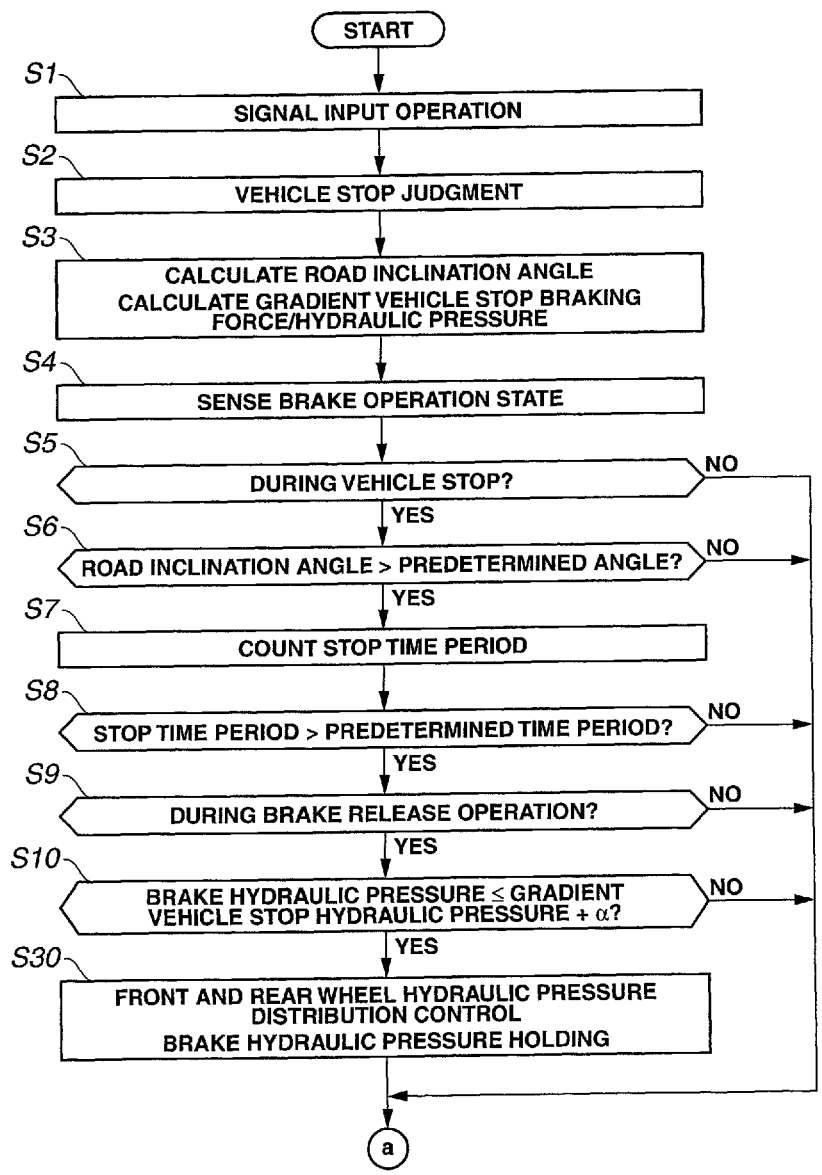
FIG. 11 is a flowchart showing a hill hold control operation performed in a hydraulic pressure unit ECU 2 in a third embodiment of the present invention.
Figure 12:
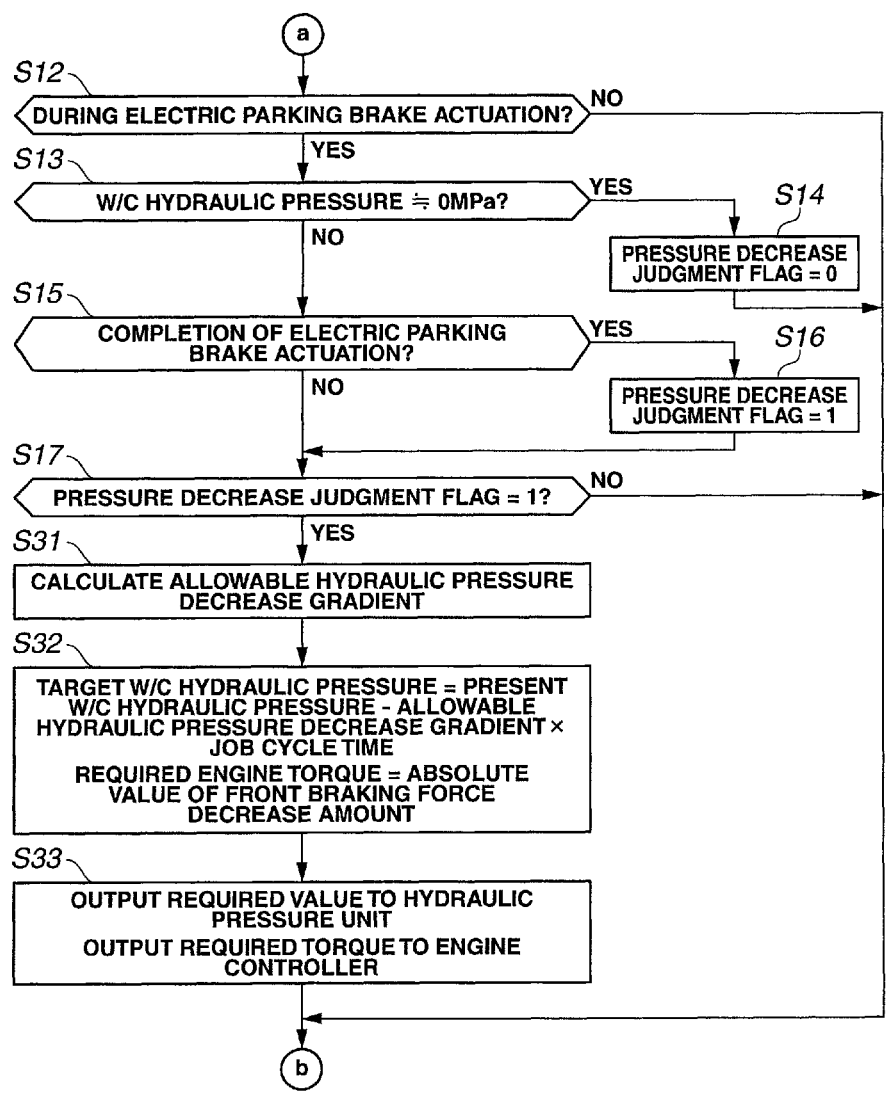
FIG. 12 is a flowchart showing the hill hold control operation performed in the hydraulic pressure unit ECU 2 in the third embodiment of the present invention.
Figure 13:
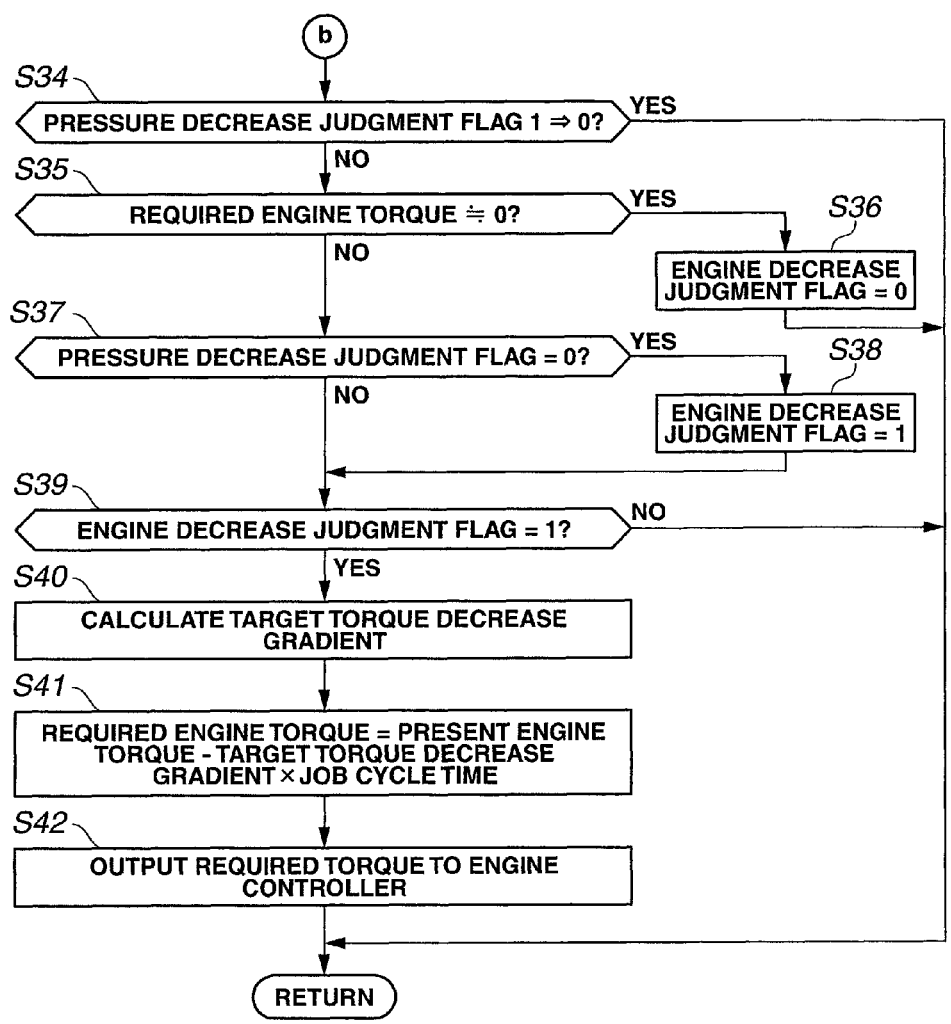
FIG. 13 is a flowchart showing the hill hold control operation performed in a hydraulic pressure unit ECU 2 in the third embodiment of the present invention.

FIGS. 11-13 are views showing the flow of the hill hold control operation performed in hydraulic pressure unit ECU 2 in the third embodiment. The operation of this flowchart is performed when the shift position of the vehicle is at the forward position (the D range position). The shift position of the vehicle is judged by the signal outputted from an inhibitor switch (shift position sensing section) through communication line 7. Illustrations of steps having operations identical to the operations of the steps shown in FIGS. 4 and 5 in the hill hold control operation in the first embodiment are omitted by the use of the same reference numerals.

At step S30, hydraulic pressure unit ECU 2 performs the front and rear wheel hydraulic pressure distribution control to distribute (allocate) the hydraulic pressures of the front and rear wheels based on the specifications of the brake of the vehicle so that the braking forces acted to the front and rear wheels are identical to each other. Then, the hydraulic pressure holding function by the hydraulic pressure unit 1 is actuated.

At step S31, braking force characteristic control section 2c calculates the allowable hydraulic pressure decrease gradient. In the third embodiment, the allowable pressure decrease gradient is set to a steep gradient by which the stick-slip phenomenon is hard to be generated.

At step S32, the pressure decrease amount of the 1 JOB cycle is calculated from the allowable hydraulic pressure decrease gradient and the JOB cycle time. A value obtained by subtracting the pressure decrease amount of the 1 JOB cycle from the current hydraulic pressure of the wheel cylinder is determined as the target hydraulic pressures of the wheel cylinders of the front wheels FL and FR. Moreover, the required engine torque is calculated as an absolute value of the decreased amount of the braking forces of the front wheels.

At step S33, braking force control switching section 2a decreases the holding pressure of the hydraulic pressure holding function of hydraulic pressure unit 1 in accordance with the value (the required hydraulic pressure of the wheel cylinder) calculated at step S32. Moreover, the torque request according to the required engine torque is outputted through communication lines 7 to the engine controller (not shown).

At step S34, it is judged whether or not the pressure decrease judgment flag is shifted from the set state (=1) to the reset state (=0). When the answer of step S34 is affirmative (YES), the process proceeds to the return. When the answer of step S34 is negative (NO), the process proceeds to step S35.

At step S35, it is judged whether or not the required engine torque is substantially zero (≈0). When the answer of step S35 is affirmative (YES), the process proceeds to step S36. When the answer of step S35 is negative (NO), the process proceeds to step S37.

At step S36, the engine decrease judgment flag is reset (=0).

At step S37, it is judged whether or not the pressure decrease judgment flag is reset. When the answer of step S37 is affirmative (YES), the process proceeds to step S38. When the answer of step S37 is negative (NO), the process proceeds to step S39.

At step S38, the engine decrease judgment flag is set.

At step S39, it is judged whether or not the engine decrease judgment flag is set. When the answer of step S39 is affirmative (YES), the process proceeds to step S40. When the answer of step S39 is negative (NO), the process proceeds to the return.

At step S40, hydraulic pressure unit ECU 2 calculates the decrease gradient by which the target torque decrease gradient is decreased to zero during the predetermined time period. In this case, the predetermined time period is a time period by which the decrease gradient does not provide the unnatural feeling to the driver by the posture variation of the vehicle body that are generated in accordance with the variation of the engine torque.

At step S41, the torque decrease amount of the 1 JOB cycle is calculated from the target torque decrease gradient and the JOB cycle time period. A value obtained by subtracting the torque decrease amount of the 1 JOB cycle from the current engine torque is calculated as the required engine torque.

At step S42, the torque request according to the required engine torque is outputted through communication lines 7 to the engine controller (not shown).

Next, functions and effects are illustrated.

Figure 14:
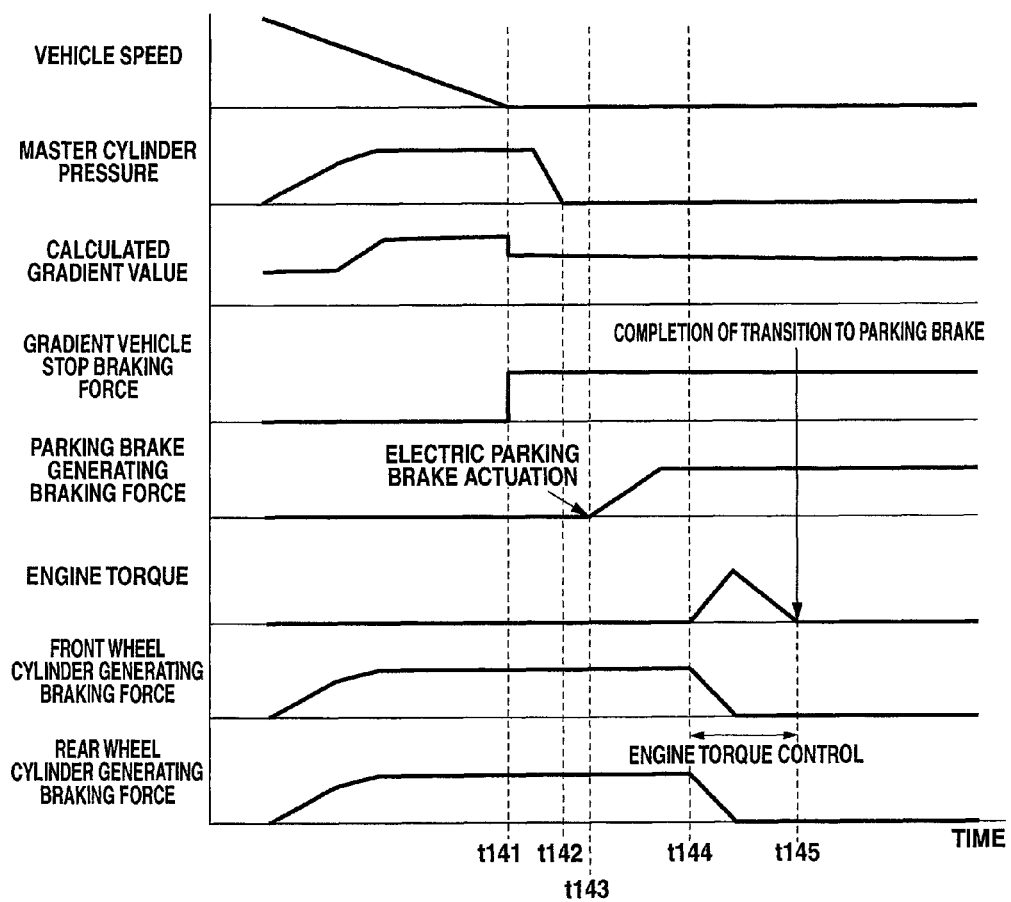
FIG. 14 is a time chart showing an unnatural feeling decreasing function by a hill hold control in a third embodiment when the brake pedal BP is not depressed at the actuation of the electric parking brake EPB.

FIG. 14 is a time chart showing the unnatural feeling decreasing function by the hill hold control in the third embodiment when the brake pedal BP is not depressed at the actuation of the electric parking brake EBP.

At time t141, the vehicle speed becomes zero. In this case, forward and backward G acted to the vehicle is only the component depending on the acceleration of the gravity. Accordingly, it is possible to calculate the calculated gradient value from forward and rearward G of the vehicle.

At time t142, the master cylinder hydraulic pressure becomes zero. However, the vehicle does not roll backwards since the hydraulic pressure holding function is already actuated.

At time t143, electric parking brake EPB is actuated since the predetermined time period elapsed from the stop of the vehicle.

At time t144, the actuation of electric parking brake EPB is finished. Accordingly, the wheel cylinder hydraulic pressures of the four wheels are decreased along the allowable hydraulic pressure decrease gradient. In the third embodiment, the allowable hydraulic pressure decrease gradient is set to a steep gradient by which the stick-slip phenomenon is hard to be generated. Accordingly, it is possible to suppress the generation of the groan noise. At this time, the engine torque is started to be increased in accordance with the decrease of the braking forces of front wheels FL and FR. Accordingly, the force to float the front portion of the vehicle body by the decrease of the braking forces of front wheels FL and FR is counteracted (canceled) by the engine torque. That is, it is possible to suppress the variation of the posture of the vehicle body itself, and thereby to further decrease the unnatural feeling to the driver.

Moreover, the engine torque is gradually decreased to zero during the predetermined time period after the wheel cylinder hydraulic pressures of front wheels FL and FR become zero. Accordingly, the variation of the posture of the vehicle body which is caused by the decrease of the engine torque becomes gentle, so that the driver does not feel the unnatural feeling. In this case, the groan noise is not generated by the decrease of the engine torque. Therefore, the engine torque can be decreased only in consideration of the variation of the posture of the vehicle body.

At time t145, the engine torque becomes zero. The state transition to electric parking brake EPB is finished.

(14) In the vehicle control apparatus according to the embodiment of the present invention, the vehicle control apparatus further includes a shift position sensing section (inhibitor switch) configured to sense a shift position of the vehicle, and a third braking force generating section configured to use a driving force of a driving source (engine) of the vehicle; and the braking force characteristic control section is configured to increase a driving torque of the third braking force generating section when the sensed shift position is in a forward position, and to decrease the hydraulic pressure generated by the first braking force generating section.

Accordingly, it is possible to suppress the variation itself of the posture of the vehicle body by the engine torque, and thereby to suppress the unnatural feeling to the driver.

(15) In the vehicle control apparatus according to the embodiment of the present invention, the vehicle control method further includes canceling a driving torque of a driving source and the braking force by decreasing the braking force generated by the first braking force generating section while the driving torque of the driving source is increased when the shift position is the forward position.

Accordingly, it is possible to suppress the variation itself of the posture of the vehicle body by the engine torque, and thereby to suppress the unnatural feeling to the driver.

Although the invention has been described above by reference to certain embodiments of the invention, the invention is not limited to the embodiments described above. Modifications and variations of the embodiments described above are included as long as they are not deviated from the gist of the invention.

For example, the second braking force generating section is not limited to the electric parking brake in the embodiments as long as the second braking force generating section is provided to a part of the plurality of wheels, and provides the braking force to the wheels by mechanically regulating.

Moreover, in the embodiments, the electric parking brakes are provided to the rear wheels. However, even when the electric parking brakes are provided to the front wheels, the variation of the posture of the vehicle body and the groan noise due to the decreases of the hydraulic pressures of the wheel cylinders of the rear wheels are generated at the stop of the vehicle on the downward sloping road. Accordingly, the present invention is applicable to this case. In this case, it is possible to attain the functions and the effects identical to those of the embodiments of the present invention.

In the third embodiment, the allowable hydraulic pressure gradient is set to the steep gradient by which the stick-slip phenomenon is hard to be generated. However, the allowable hydraulic pressure gradient may be set based on the map of FIG. 6, like the first and second embodiments.

(a) In the vehicle control apparatus according to the embodiments of the present invention, the braking force characteristic control section is configured to increase the hydraulic pressure of the wheel cylinder of the one of the wheels which is held by the first braking force generating section actuation state holding section, and then to decrease the hydraulic pressures of the wheel cylinders of the wheels.

Accordingly, it is possible to surely prevent the vehicle from rolling backwards.

(b) In the vehicle control apparatus according to the embodiments of the present invention, the braking force characteristic control section is configured to decrease the hydraulic pressures of the wheel cylinders provided to the others of the wheels, and to increase the hydraulic pressure of the wheel cylinder provided to the one of the wheels by the decreased amount of the hydraulic pressures of the wheel cylinders provided to the others of the wheels.

Accordingly, it is possible to decrease the hydraulic pressure decrease gradient when the hydraulic pressures of the other of the wheels are decreased to zero, and thereby to further decrease the unnatural feeling to the driver. Moreover, it is possible to prevent the vehicle from rolling backwards since the total braking force of the vehicle is held to the constant value.

(c) In the vehicle control apparatus according to the embodiments of the present invention, the braking force characteristic control section is configured to determine the characteristic of the hydraulic pressure to keep a total braking force at the increase and the decrease of the hydraulic pressures of the wheel cylinder.

Accordingly, it is possible to prevent the vehicle from rolling backwards since the total braking force of the vehicle is held to the constant value.

(d) In the vehicle control apparatus according to the embodiments of the present invention, the vehicle control apparatus further includes a vehicle stop state judging section configured to judge a stop state of the vehicle; and the first braking force generating section actuation state holding section is configured to actuate after the vehicle stop state judging section judges the stop state of the vehicle.

That is, the hydraulic pressures are held in a state where the hydraulic pressures to keep the stop state of the vehicle is ensured in the wheel cylinders of the front and rear wheels.

(e) In the vehicle control apparatus according to the embodiments of the present invention, the predetermined condition is that a predetermined time period elapses from the actuation of the first braking force generating section actuation state holding section.

That is, it is possible to prevent the vehicle from rolling backwards by switching the braking force after the completion of the holding of the hydraulic pressure by the first braking force generating section actuation state holding section.

(f) In the vehicle control apparatus according to the embodiments of the present invention, the vehicle control apparatus further includes a shift position sensing section configured to sense a shift position of the vehicle, and a third braking force generating section configured to use a driving force of a driving source of the vehicle; and the braking force characteristic control section is configured to increase a driving torque of the third braking force generating section when the sensed shift position is in a forward position, and to decrease the hydraulic pressure generated by the first braking force generating section.

Accordingly, it is possible to suppress the variation itself of the posture of the vehicle body by the driving torque of the third braking force generating section, and thereby to relieve the unnatural feeling to the driver.

(g) A vehicle control apparatus according to the embodiments of the present invention includes: a first braking force generating section configured to actuate, by a hydraulic pressure, wheel cylinders provided to a plurality of wheels mounted to a vehicle, and thereby to generate a braking force to the wheels by sandwiching discs by brake pads; a second braking force generating section provided to one of the plurality of the wheels, provided as a section different from the first braking force generating section, and arranged to provide to a braking force to the wheels; a first hydraulic pressure generating section actuation state holding section configured to actuate the first braking force generating section in accordance with a brake operation of a driver, and then to hold an actuation state of the first braking force generating section; a braking force control section switching section configured to automatically switch the second braking force generating section from a non-actuation state to an actuation state when the first hydraulic pressure generating section actuation state holding section holds the actuation state and a predetermined condition is satisfied in the non-actuation state of the second braking force generating section; and a braking force characteristic control section configured to control a braking force characteristic generated by the first hydraulic pressure generating section actuation state holding section at the switching of the braking force control section switching section.

Accordingly, it is possible to adjust the variation speed of the posture of the vehicle body and the frequency of the generation of the groan noise which are generated when the hydraulic pressure of the first braking force generating section is decreased, and thereby to decrease the unnatural feeling by the variation of the posture of the vehicle body and the brake noise.

(h) In the vehicle control apparatus according to the embodiments of the present invention, the braking force characteristic control section is configured to increase the hydraulic pressure of the wheel cylinder of the one of the wheels which is held by the first braking force generating section actuation state holding section, and then to decrease the hydraulic pressures of the wheel cylinders of the wheels.

Accordingly, it is possible to surely prevent the vehicle from rolling backwards.

(i) In the vehicle control apparatus according to the embodiments of the present invention, the braking force characteristic control section is configured to decrease the hydraulic pressures of the wheel cylinders provided to the others of the wheels, and to increase the hydraulic pressure of the wheel cylinder provided to the one of the wheels by the decreased amount of the hydraulic pressures of the wheel cylinders provided to the others of the wheels.

Accordingly, it is possible to decrease the gradients of the decrease of the hydraulic pressures when the hydraulic pressures of the other of the wheels are decreased to zero, and thereby to further decrease the unnatural feeling to the driver. Moreover, it is possible to prevent the vehicle from rolling backwards since the total braking force is held to the constant value.

(j) In the vehicle control apparatus according to the embodiments of the present invention, the braking force characteristic control section is configured to determine the characteristic of the hydraulic pressure to keep a total braking force at the increase and the decrease of the hydraulic pressures of the wheel cylinder.

Accordingly, it is possible to prevent the rearward movement of the vehicle since the total braking force is held to the constant value.

(k) In the vehicle control apparatus according to the embodiments of the present invention, the braking force characteristic control section is configured to limit a decrease gradient of the hydraulic pressure when the hydraulic pressure of one of the wheel cylinders is decreased, to a value equal to or smaller than a predetermined gradient.

That is, it is possible to suppress the variation speed of the posture of the vehicle body and the generation frequency of the groan noise, to the speed and the frequency which does not provide the unnatural feeling to the driver, by limiting the hydraulic pressure decrease gradient.

(l) In the vehicle control apparatus according to the embodiments of the present invention, the braking force characteristic control section is configured to limit decrease gradients of the hydraulic pressures of the wheel cylinders provided to the others of the plurality of the wheels, to the value equal to or smaller than the predetermined gradient.

That is, it is possible to suppress the variation speed of the posture of the vehicle body and the generation frequency of the groan noise, to the speed and the frequency which does not provide the unnatural feeling to the driver, by limiting the decrease gradient of the wheel cylinder hydraulic pressures of the other of the wheels which causes the variation of the posture of the vehicle body, and the generation of the groan noise.

(m) In the vehicle control apparatus according to the embodiments of the present invention, the vehicle control apparatus further includes a shift position sensing section configured to sense a shift position of the vehicle, and a third braking force generating section configured to use a driving force of a driving source of the vehicle; and the braking force characteristic control section is configured to increase a driving torque of the third braking force generating section when the sensed shift position is in a forward position, and to decrease the hydraulic pressure generated by the first braking force generating section.

Accordingly, it is possible to suppress the variation itself of the posture of the vehicle body by the driving torque of the third braking force generating section, and thereby to decrease the unnatural feeling to the driver.

(n) A vehicle control method according to the embodiments of the present invention: stopping a vehicle by sandwiching discs rotating with wheels by brake pads each provided to a first braking force generating section by a brake operation of a driver; holding a braking force by the first braking force generating sections after the stop of the vehicle until a predetermined condition is satisfied; decreasing the braking force by disengaging the brake pads and the discs by the first braking force generating sections after the satisfaction of the predetermined condition; previously decreasing the braking force by the first braking force generating sections which is acted to the others of the wheels at switching to an automatic parking brake which can generate the braking force to one of the wheels of the vehicle, and which is a section different from the first braking force generating section; acting the decreased amount of the braking force to the one of the wheels; and limiting decrease gradients of the braking forces generated at the others of the wheels, to a value equal to or smaller than a predetermined gradient.

Accordingly, it is possible to decrease the decrease gradient of the hydraulic pressure when the wheel cylinder hydraulic pressures of the other of the wheels are decreased to zero, and thereby to further decrease the unnatural feeling to the driver. Moreover, it is possible to prevent the vehicle from rolling backwards since the total braking force of the vehicle is held to the constant value. Moreover, it is possible to suppress the variation of the posture of the vehicle body and the generation frequency of the groan noise, to the value which does not provide the unnatural feeling to the driver, by limiting the decrease gradient of the wheel cylinder hydraulic pressures of the other of the wheels which may cause the variation of the posture of the vehicle body and the generation of the groan noise.

(o) In the vehicle control apparatus according to the embodiments of the present invention, the vehicle control method further includes canceling a driving torque of a driving source and the braking force by decreasing the braking force generated by the first braking force generating section while the driving torque of the driving source is increased when the shift position is the forward position.

Accordingly, it is possible to suppress the variation itself of the posture of the vehicle body by the driving torque of the third braking force generating section, and thereby to decrease the unnatural feeling to the driver.

The entire contents of Japanese Patent Application No. 2012-014755 filed Jan. 27, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A vehicle control apparatus comprising:
   a first braking force generating section configured to actuate, by hydraulic pressure, wheel cylinders which are mounted on a vehicle, which are connected through hydraulic pipes with a master cylinder, and which are provided, respectively, to a plurality of wheels, and thereby to generate a braking force to the wheels;
   a second braking force generating section which is provided to one of the plurality of the wheels, and which is configured to be mechanically regulated to provide the braking force to the one of the plurality of wheels;

a braking force control switching section configured to automatically switch the second braking force generating section from a non-actuation state to an actuation state when a predetermined condition is satisfied in an actuation state of the first braking force generating section and in the non-actuation state of the second braking force generating section, to decrease the hydraulic pressure of the first braking force generating section, and thereby to switch the first braking force generating section to the non-actuation state; and a braking force characteristic control section configured to control a braking force characteristic which is generated by the first braking force generating section, and is associated with switching of the braking force control switching section, wherein the braking force characteristic control section is configured to limit decrease gradients of hydraulic pressures of wheel cylinders provided to others of the plurality of the wheels to a value equal to or smaller than a predetermined gradient.

2. The vehicle control apparatus as claimed in claim 1, wherein the vehicle control apparatus further comprises a first hydraulic pressure generating section actuation state holding section configured to hold a state of the hydraulic pressures of the wheel cylinders after an end of an operation of a brake by a driver after the actuation of the first braking force generating section by the operation of the brake by the driver; and the braking force control switching section is configured to perform the switching after the actuation of the first hydraulic pressure generating section actuation state holding section.

3. The vehicle control apparatus as claimed in claim 2, wherein the braking force characteristic control section is configured to limit a decrease gradient of the hydraulic pressure when the hydraulic pressure of one of the wheel cylinders is decreased, to the value equal to or smaller than the predetermined gradient.

4. The vehicle control apparatus as claimed in claim 3, wherein the predetermined gradient of the hydraulic pressure is set so that a cycle of noise generated in response to the decrease of the hydraulic pressure of the first braking force generating section becomes equal to or greater than a predetermined cycle of noise.

5. The vehicle control apparatus as claimed in claim 2, wherein the braking force characteristic control section is configured to increase the hydraulic pressure of the wheel cylinder of the one of the plurality of wheels, which hydraulic pressure is held by the first braking force generating section actuation state holding section, and then to decrease the hydraulic pressures of the wheel cylinders of the wheels.

6. The vehicle control apparatus as claimed in claim 5, wherein the braking force characteristic control section is configured to decrease the hydraulic pressures of the wheel cylinders provided to the others of the plurality of wheels by a predetermined amount, and to increase the hydraulic pressure of the wheel cylinder provided to the one of the plurality of wheels by the predetermined amount.

7. The vehicle control apparatus as claimed in claim 6, wherein the braking force characteristic control section is configured to determine a characteristic of the hydraulic pressure to keep a total braking force upon the increase and the decrease of the hydraulic pressures of the wheel cylinder.

8. The vehicle control apparatus as claimed in claim 2, wherein the vehicle control apparatus further comprises a vehicle stop state judging section configured to judge a stop state of the vehicle; and the first braking force generating section actuation state holding section is configured to hold the state of the hydraulic pressures of the wheel cylinders after the vehicle stop state judging section judges the stop state of the vehicle.

9. The vehicle control apparatus as claimed in claim 2, wherein the predetermined condition is that a predetermined time period elapses from the actuation of the first braking force generating section actuation state holding section.

10. The vehicle control apparatus as claimed in claim 2, wherein the vehicle control apparatus further comprises a shift position sensing section configured to sense a shift position of the vehicle, and a third braking force generating section configured to use a driving force of a driving source of the vehicle; and the braking force characteristic control section is configured to increase a driving torque of the third braking force generating section when the sensed shift position is in a forward position, and to decrease the hydraulic pressure generated by the first braking force generating section.

11. A vehicle control apparatus comprising:

a first braking force generating section configured to actuated by a hydraulic pressure, wheel cylinders provided to a plurality of wheels mounted to a vehicle, and thereby to generate a braking force to the wheels by sandwiching discs by brake pads;

a second braking force generating section provided to one of the plurality of the wheels, provided as a section different from the first braking force generating section, and arranged to provide to a braking force to the wheels;

a first hydraulic pressure generating section actuation state holding section configured to actuate the first braking force generating section in accordance with a brake operation of a driver, and then to hold an actuation state of the first braking force generating section;

a braking force control section switching section configured to automatically switch the second braking force generating section from a non-actuation state to an actuation state when the first hydraulic pressure generating section actuation state holding section holds the actuation state and a predetermined condition is satisfied in the non-actuation state of the second braking force generating section; and a braking force characteristic control section configured to control a braking force characteristic generated by the first hydraulic pressure generating section actuation state holding section at the switching of the braking force control section switching section, wherein the braking force characteristic control section is configured to decrease hydraulic pressures of others of the plurality of wheels before the switching of the second braking force generating section from the non-actuation state to the actuation state, and wherein the braking force characteristic control section is configured to increase the hydraulic pressure of the wheel cylinder of one of the plurality of wheels, which hydraulic pressure is held by the first braking force generating section actuation state holding section, and then to decrease hydraulic pressures of the wheel cylinders.

12. The vehicle control apparatus as claimed in claim 11, wherein the braking force characteristic control section is configured to decrease the hydraulic pressures of the wheel cylinders provided to the others of the plurality of wheels by a predetermined amount, and to increase the hydraulic pressure of the wheel cylinder provided to the one of the plurality of wheels by the predetermined amount.

13. The vehicle control apparatus as claimed in claim 12, wherein the braking force characteristic control section is configured to determine a characteristic of the hydraulic pressure to keep a total braking force upon the increase and the decrease of the hydraulic pressures of the wheel cylinder.

14. The vehicle control apparatus as claimed in claim 11, wherein the braking force characteristic control section is configured to limit a decrease gradient of the hydraulic pressure when the hydraulic pressure of one of the wheel cylinders is decreased, to a value equal to or smaller than a predetermined gradient.

15. The vehicle control apparatus as claimed in claim 14, wherein the braking force characteristic control section is configured to limit decrease gradients of the hydraulic pressures of the wheel cylinders provided to the others of the plurality of the wheels, to the value equal to or smaller than the predetermined gradient.

16. The vehicle control apparatus as claimed in claim 11, wherein the vehicle control apparatus further comprises a shift position sensing section configured to sense a shift position of the vehicle, and a third braking force generating section configured to use a driving force of a driving source of the vehicle; and the braking force characteristic control section is configured to increase a driving torque of the third braking force generating section when the sensed shift position is in a forward position, and to decrease the hydraulic pressure generated by the first braking force generating section.

17. A vehicle control method comprising:
stopping a vehicle by sandwiching discs rotating with wheels by brake pads each provided to a first braking force generating section by a brake operation of a driver, the vehicle having an automatic parking brake configured to generate a braking force to one of the wheels;
holding a braking force by the first braking force generating section after the stop of the vehicle until a predetermined condition is satisfied;
decreasing the braking force by disengaging the brake pads and the discs by the first braking force generating section after satisfaction of the predetermined condition;
decreasing the braking force by a predetermined amount by the first braking force generating section which is acted to others of the wheels at switching to the automatic parking brake, which is a section different from the first braking force generating section; and
acting the predetermined decreased amount of the braking force to the one of the wheels; or limiting decrease gradients of the braking forces generated at the others of the wheels, to a value equal to or smaller than a predetermined gradient.

18. The vehicle control method as claimed in claim 17, wherein the vehicle control method further comprises canceling a driving torque of a driving source and the braking force by decreasing the braking force generated by the first braking force generating section while the driving torque of the driving source is increased when a shift position is a forward position.

* * * * *